(12) United States Patent
Nakagawa et al.

(10) Patent No.: US 9,304,298 B2
(45) Date of Patent: Apr. 5, 2016

(54) ZOOM LENS AND IMAGE PICKUP APPARATUS USING THE SAME

(71) Applicants: OLYMPUS IMAGING CORP., Tokyo (JP); OLYMPUS CORPORATION, Tokyo (JP)

(72) Inventors: Koji Nakagawa, Kanagawa (JP); Koki Hozumi, Tokyo (JP); Akiko Naito, Tokyo (JP); Takeshi Hosoya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/208,091

(22) Filed: Mar. 13, 2014

(65) Prior Publication Data

US 2014/0267877 A1    Sep. 18, 2014

(30) Foreign Application Priority Data

Mar. 13, 2013  (JP) ................................. 2013-050189

(51) Int. Cl.

| G02B 15/14 | (2006.01) |
|---|---|
| G02B 17/08 | (2006.01) |
| G02B 13/00 | (2006.01) |
| G02B 17/02 | (2006.01) |
| G02B 15/177 | (2006.01) |
| H04N 5/225 | (2006.01) |

(52) U.S. Cl.
CPC .............. *G02B 13/009* (2013.01); *G02B 15/14* (2013.01); *G02B 15/177* (2013.01); *G02B 17/023* (2013.01); *H04N 5/2254* (2013.01)

(58) Field of Classification Search
CPC ........ G02B 15/00; G02B 15/14; G02B 15/15; G02B 15/16; G02B 13/009; G02B 17/023
USPC .......... 359/676, 678, 686, 687, 689, 690, 726
See application file for complete search history.

(56) References Cited

U.S. PATENT DOCUMENTS

| 7,636,201 B2 | 12/2009 | Sudoh et al. | |
|---|---|---|---|
| 7,719,773 B2 * | 5/2010 | Atsuumi et al. | ............... 359/683 |
| 7,864,443 B2 * | 1/2011 | Sudoh et al. | .................. 359/684 |

(Continued)

FOREIGN PATENT DOCUMENTS

| JP | 2009-128620 | 6/2009 |
|---|---|---|
| JP | 2011-017772 | 1/2011 |

(Continued)

*Primary Examiner* — Darryl J Collins
(74) *Attorney, Agent, or Firm* — Kenyon & Kenyon LLP

(57) ABSTRACT

A zoom lens includes a first positive lens unit, a first negative lens unit, a stop, and a second positive lens unit, and at the time of zooming, the first positive lens unit is stationary, the first negative lens unit and the second positive lens unit move, and at the time of focusing, the first positive lens unit is stationary, and the first positive lens unit includes a reflecting member and a first positive lens unit object-side system, and the first positive lens unit-object side system is positioned on the object side of the reflecting member, and has a negative refractive power, and the following conditional expressions are satisfied.

$3.7 < f/f_w$ $1.55 < |D_{1N}/D_{2P}| < 2.5$ $1.75 < |f_{2P}/D_{2P}| < 2.5$

28 Claims, 17 Drawing Sheets

(56) References Cited

U.S. PATENT DOCUMENTS

| | | | |
|---|---|---|---|
| 8,018,659 B2 * | 9/2011 | Mihara | 359/683 |
| 8,446,678 B2 * | 5/2013 | Mihara | 359/676 |
| 8,654,447 B2 * | 2/2014 | Morooka | 359/683 |
| 2006/0285841 A1 * | 12/2006 | Masui et al. | 396/72 |
| 2007/0070521 A1 * | 3/2007 | Hayakawa | 359/686 |
| 2007/0109661 A1 * | 5/2007 | Bito et al. | 359/676 |
| 2013/0286276 A1 * | 10/2013 | Kawamura et al. | 348/345 |

FOREIGN PATENT DOCUMENTS

| | | |
|---|---|---|
| JP | 2011-095504 | 5/2011 |
| JP | 2011-095505 | 5/2011 |

* cited by examiner

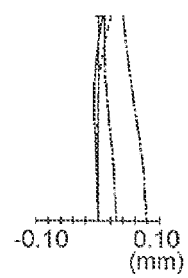
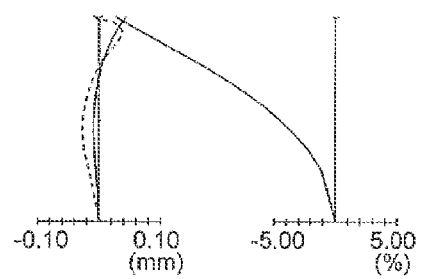
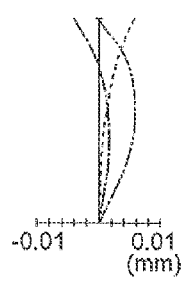
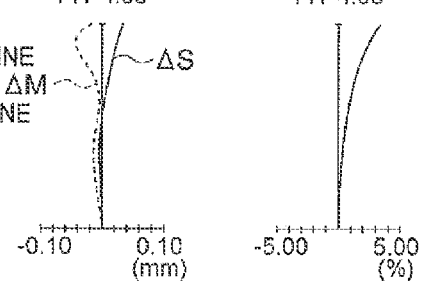
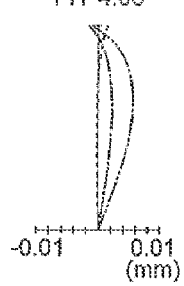
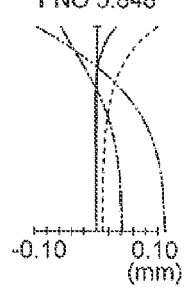
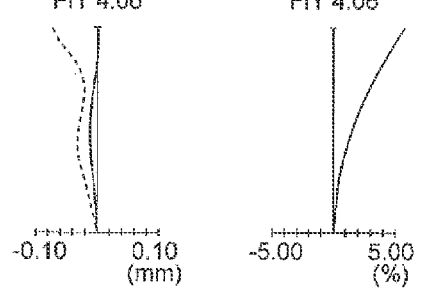
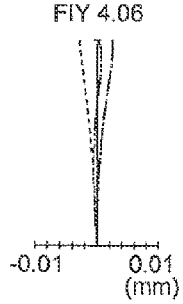

SA  
FNO 4.034

AS  
FIY 3.45

DT  
FIY 3.45

CC  
FIY 3.45

SA  
FNO 5.078

AS  
FIY 4.06

DT  
FIY 4.06

CC  
FIY 4.06

SA  
FNO 5.431

AS  
FIY 4.06

DT  
FIY 4.06

CC  
FIY 4.06

SA
FNO 3.860

-0.10    0.10
    (mm)

AS
FIY 3.44

-0.10    0.10
    (mm)

DT
FIY 3.44

-5.00    5.00
    (%)

CC
FIY 3.44

-0.01    0.01
    (mm)

SA
FNO 4.911

-0.10    0.10
    (mm)

AS
FIY 4.06

-0.10    0.10
    (mm)

DT
FIY 4.06

-5.00    5.00
    (%)

CC
FIY 4.06

-0.01    0.01
    (mm)

SA
FNO 5.486

-0.10    0.10
    (mm)

AS
FIY 4.06

-0.10    0.10
    (mm)

DT
FIY 4.06

-5.00    5.00
    (%)

CC
FIY 4.06

-0.01    0.01
    (mm)

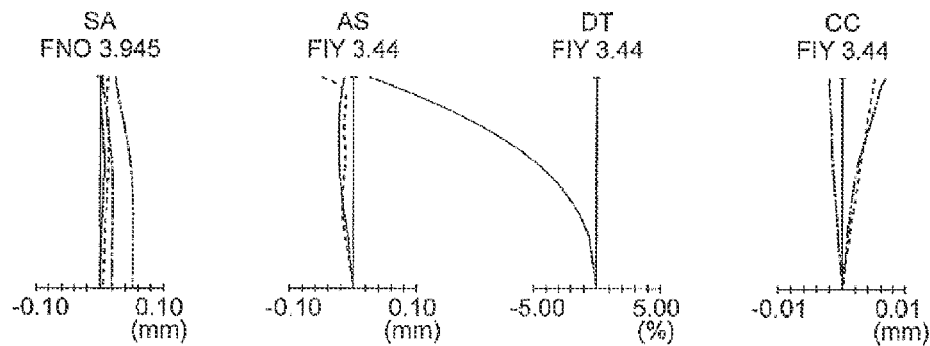
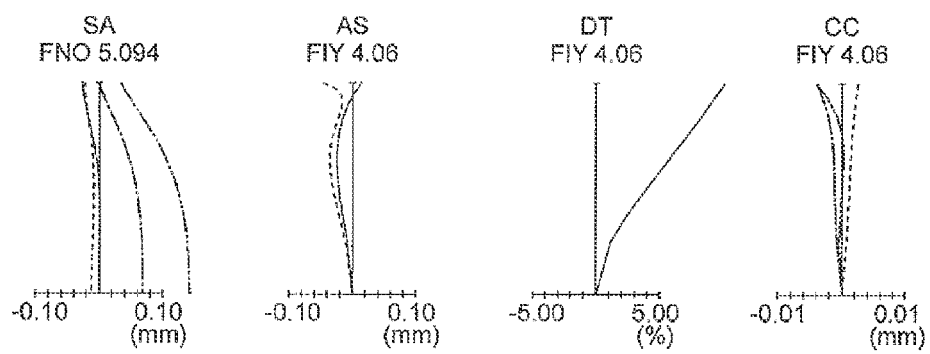
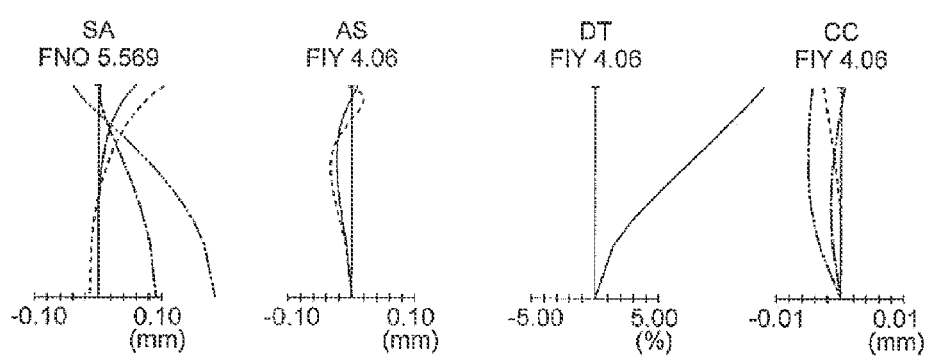

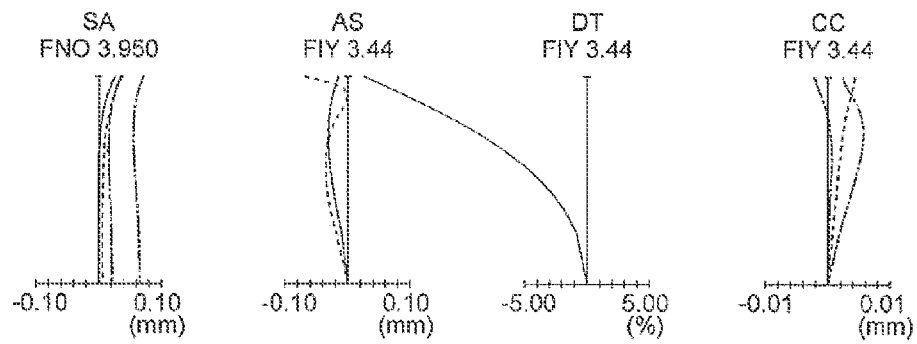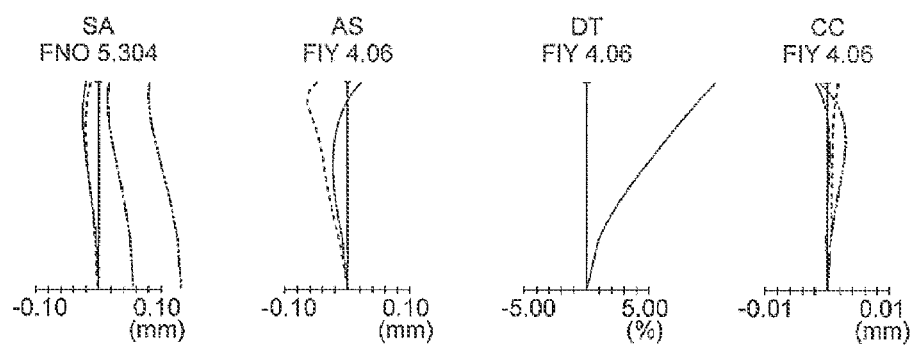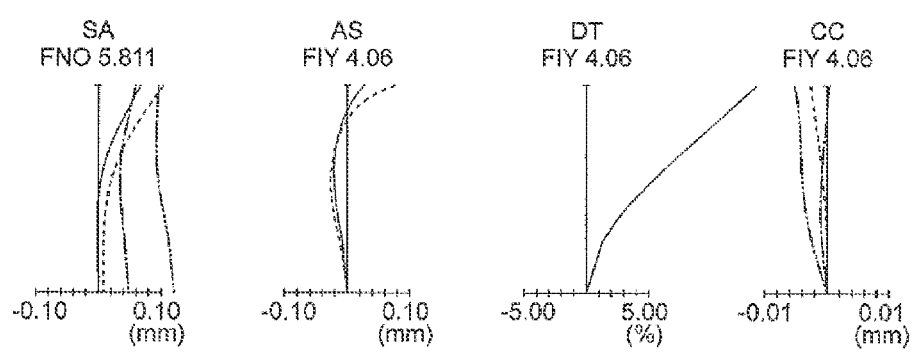

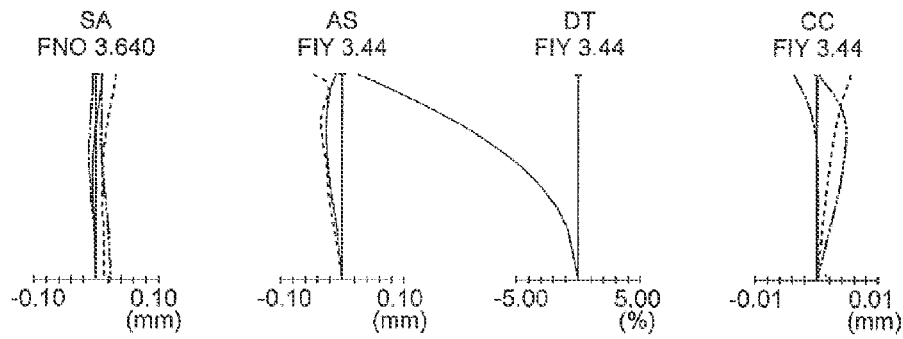
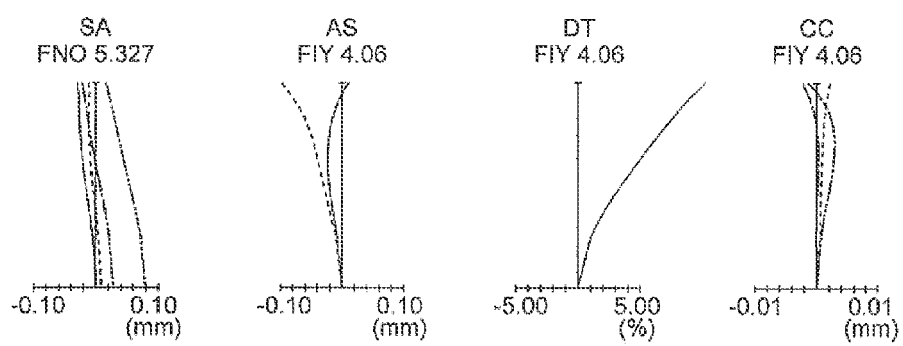
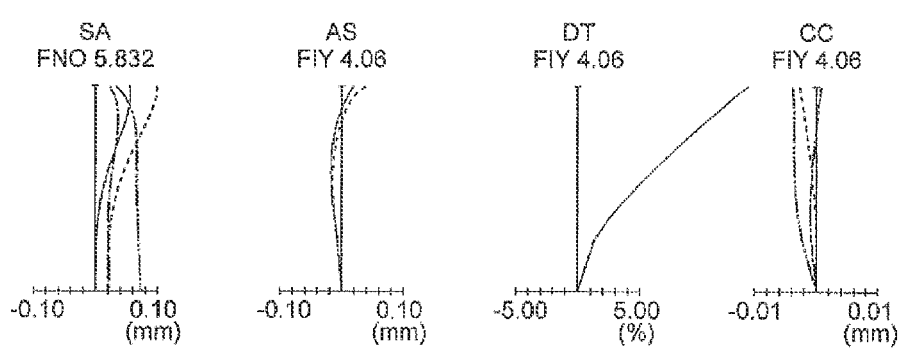

ZOOM LENS AND IMAGE PICKUP APPARATUS USING THE SAME

CROSS-REFERENCE TO RELATED APPLICATION

The present application is based upon and claims the benefit of priority from the prior Japanese Patent Application No. 2013-050189 filed on Mar. 13, 2013; the entire contents of which are incorporated herein by reference.

BACKGROUND OF THE INVENTION

1. Field of the Invention

The present invention relates to a zoom lens and an image pickup apparatus using the same.

2. Description of the Related Art

Size reduction and weight reduction of an image pickup apparatus such as a digital camera in which, an electronic image pickup element is used, have been sought. As a zoom lens which deals with these expectations, a zoom lens in which, a reflecting surface is disposed in an optical path of an optical system, and the optical path is bent by reflection at the reflecting surface has hitherto been known. By an arrangement of bending the optical path of the optical system, slimming and small-sizing of not only the optical system, but also of an image pickup apparatus are possible. Therefore, an image pickup apparatus in which, such zoom lens is used, is popular.

Moreover, for a zoom lens, a zoom lens having a large zoom ratio has been sought. This is because a zoom lens with a large zoom ratio is capable of coping with scenes of capturing of even wider range.

A zoom lens with an arrangement of bending an optical path, and having a comparatively wide angle of view, and an image pickup apparatus which includes such zoom lens are disclosed in Japanese Patent Application Laid-open Publication Nos. 2009-128620, 2011-095504, 2011-095505, and 2011-017772.

SUMMARY OF THE INVENTION

A zoom lens according to the present invention comprises
a first positive lens unit having a positive refractive power,
a first negative lens unit having a negative refractive power,
a stop, and
a second positive lens unit having a positive refractive power, and
the first positive lens unit and the first negative lens unit are disposed in order of the first positive lens unit and the first negative lens unit from an object side to an image side, and
the second positive lens unit is disposed on the image side of the first negative lens unit, and
the stop is disposed between the first negative lens unit and the second positive lens unit, and
each of the first positive lens unit, the first negative lens unit, and the second positive lens unit includes a lens component, and
at the time of zooming from a wide angle end to a telephoto end,
the first positive lens unit is stationary, and
the first negative lens unit moves toward the image side, and comes closer to the stop, and
the second positive lens unit moves toward the object side and comes closer to the stop, and
at the time of focusing, the first positive lens unit is stationary, and the first positive lens unit includes a reflecting member having a reflecting surface which bends an optical path, and a first positive lens unit object-side system, and
the first positive lens unit object-side system is positioned on the object side of the reflecting surface, and has a negative refractive power, and
the following conditional expressions (1), (2), and (3) are satisfied $$3.7 < f_t/f_w \tag{1}$$

$$1.55 < |D_{1N}/D_{2P}| < 2.5 \tag{2}$$

$$1.75 < |f_{2P}/D_{2P}| < 2.5 \tag{3}$$

where,
$f_t$ denotes a focal length of the overall zoom lens system at the telephoto end,
$f_w$ denotes a focal length of the overall zoom lens system at the wide angle end,
and both $f_t$ and $f_w$ are focal lengths when focused to an object at infinity, and $$D_{1N} = D_{1Nt} - D_{1Nw}, D_{2P} = D_{2Pt} - D_{2Pw}, \text{ where}$$

$D_{1Nt}$ denotes a distance between the first negative lens unit and an image plane, at the telephoto end,
$D_{1Nw}$ denotes a distance between the first negative lens unit and the image plane, at the wide angle end,
$D_{2Pt}$ denotes a distance between the second positive lens unit and the image plane, at the telephoto end, and
$D_{2Pw}$ denotes a distance between the second positive lens unit and the image plane, at the wide angle end, and
each of $D_{1Nt}$, $D_{1Nw}$, $D_{2Pt}$, and $D_{2Pw}$ is a focal length when focused to an object at infinity, and
$f_{2P}$ is a focal length of the second positive lens unit, and
the lens component is a component which has two surfaces namely an object-side surface and an image-side surface, as refracting surfaces in contact with air.

Moreover, an image pickup apparatus according to the present invention comprises a zoom lens, and an image pickup element which converts an image formed by the zoom lens to an electric signal.

BRIEF DESCRIPTION OF THE DRAWINGS

FIG. 1A is a lens cross-sectional view at a wide angle end, FIG. 1B is a lens cross-sectional view in an intermediate focal length state, and FIG. 1C is a lens cross-sectional view at a telephoto end;

FIG. 2A is a lens cross-sectional view at a wide angle end, FIG. 2B is a lens cross-sectional view in an intermediate focal length state, and FIG. 2C is a lens cross-sectional view at a telephoto end;

FIG. 3A is a lens cross-sectional view at a wide angle end, FIG. 3B is a lens cross-sectional view in an intermediate focal length state, and FIG. 3C is a lens cross-sectional view at a telephoto end;

FIG. 4A is a lens cross-sectional view at a wide angle end, FIG. 4B is a lens cross-sectional view in an intermediate focal length state, and FIG. 4C is a lens cross-sectional view at a telephoto end;

FIG. 5A is a lens cross-sectional view at a wide angle end, FIG. 5B is a lens cross-sectional view in an intermediate focal length state, and FIG. 5C is a lens cross-sectional view at a telephoto end;

FIG. 6A is a lens cross-sectional view at a wide angle end, FIG. 6B is a lens cross-sectional view in an intermediate focal length state, and FIG. 6C is a lens cross-sectional view at a telephoto end;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L are aberration diagrams at the time of infinite object point focusing of the zoom lens of the example 1;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams at the time of infinite object point focusing of the zoom lens of the example 4;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams at the time of infinite object point focusing of the zoom lens of the example 5;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams at the time of infinite object point focusing of the zoom lens of the example 6;

DETAILED DESCRIPTION OF THE INVENTION

Figure 1A:
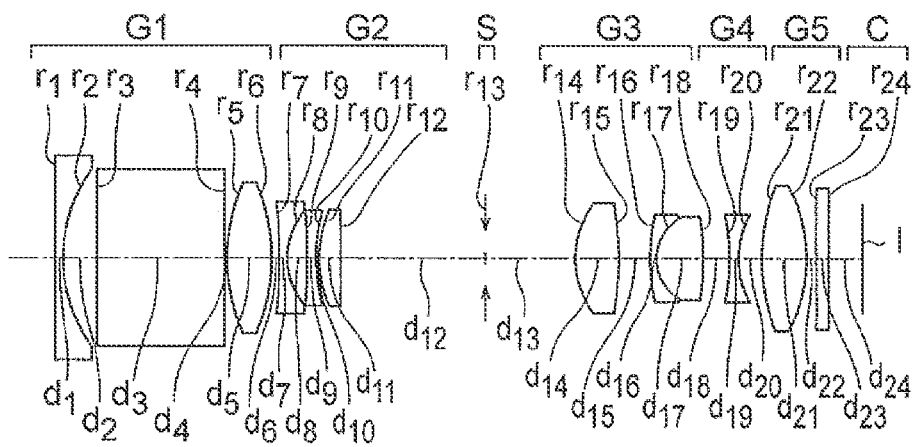
FIG. 1A, FIG. 1B, and FIG. 1C are lens cross-sectional views at the time of infinite object point focusing of a zoom lens according to an example 1, where.

An embodiment and examples of a zoom lens and an image pickup apparatus including the zoom lens will be described below by referring to the accompanying diagrams. However, the present invention is not restricted to the embodiment and the examples described below.

In the following description, a thickness means a length in a direction in which, a light ray is incident on a zoom lens from an object side. For instance, in a case in which, a reflecting member is used in the zoom lens, the thickness of the zoom lens is a length from a lens surface nearest to the object side (refracting surface on the object side) up to the reflecting member.

A zoom lens according to the embodiment includes a first positive lens unit having a positive refractive power, a first negative lens unit having a negative refractive power, a stop, and a second positive lens unit having a positive refractive power, and the first positive lens unit and the first negative lens unit are disposed in order of the first positive lens unit and the first negative lens unit from an object side to an image side, and the second positive lens unit is disposed on the image side of the first negative lens unit, and the stop is disposed between the first negative lens unit and the second positive lens unit, and each of the first positive lens unit, the first negative lens unit, and the second positive lens unit includes a lens component, and at the time of zooming from a wide angle end to a telephoto end, the first positive lens unit is stationary, and the first negative lens unit moves toward the image side, and comes closer to the stop, and the second positive lens unit moves toward the object side and comes closer to the stop, and at the time of focusing, the first positive lens unit is stationary, and the first positive lens unit includes a reflecting member having a reflecting surface which bends an optical path, and a first positive lens unit object-side system, and the first positive lens unit object-side system is positioned on the object side of the reflecting surface, and has a negative refractive power, and the following conditional expressions (1), (2), and (3) are satisfied.

$$3.7 < f_t/f_w \tag{1}$$

$$1.55 < |D_{1N}/D_{2P}| < 2.5 \tag{2}$$

$$1.75 < |f_{2P}/D_{2P}| < 2.5 \tag{3}$$

where, $f_t$ denotes a focal length of the overall zoom lens system at the telephoto end, $f_w$ denotes a focal length of the overall zoom lens system at the wide angle end, and both $f_t$ and $f_w$ are focal lengths when focused to an object at infinity, and $D_{1N} = D_{1Nt} - D_{1Nw}$, $D_{2P} = D_{2Pt} - D_{2Pw}$, where $D_{1Nt}$ denotes a distance between the first negative lens unit and an image plane, at the telephoto end, $D_{1Nw}$ denotes a distance between the first negative lens unit and the image plane, at the wide angle end, $D_{2Pt}$ denotes a distance between the second positive lens unit and the image plane, at the telephoto end, and $D_{2Pw}$ denotes a distance between the second positive lens unit and the image plane, at the wide angle end, and each of $D_{1Nt}$, $D_{1Nw}$, $D_{2Pt}$, and $D_{2Pw}$ is a focal length when focused to an object at infinity, and $f_{2P}$ is a focal length of the second positive lens unit, and the lens component is a component which has two surfaces namely an object-side surface and an image-side surface, as refracting surfaces in contact with air.

The zoom lens according to the present embodiment includes the first positive lens unit having a positive refractive power, the first negative lens unit having a negative refractive power, the stop, and the second positive lens unit having a positive refractive power, and the first positive lens unit and the first negative lens unit are disposed in order of the first positive lens unit and the first negative lens unit from the object side to the image side, and the second positive lens unit is disposed on the image side of the first negative lens unit, and the stop is disposed between the first negative lens unit and the second positive lens unit.

By making such an arrangement, it is possible to slim the thickness of the zoom lens. Moreover, such an arrangement is advantageous for shortening the overall length of the zoom lens, and for securing a high zooming ratio. Moreover, the order of arrangement of the refractive power of the lens units being positive refractive power, negative refractive power, and positive refractive power, it becomes easy to improve symmetry of disposition of refractive power. Moreover, such an arrangement is appropriate for suppressing a fluctuation in an off-axis aberration at the time of zooming. Accordingly, it becomes easy to secure a state in which, aberrations such as an astigmatism and a comma aberration in particular, are corrected favorably at the time of zooming.

Moreover, each of the first positive lens unit, the first negative lens unit, and the second positive lens unit includes a lens component. Here, the lens component has two surfaces namely, an object-side surface and an image-side surface, as refracting surfaces in contact with air. A single lens and a cemented lens are examples of the lens component. Such lenses are formed by two surfaces namely, an object-side surface and an image-side surface. Moreover, the reflecting member has a surface of incidence, a reflecting surface, and a surface of emergence, and in a case in which, at least one of the surface of incidence and the surface of emergence is a lens surface, such reflecting member is also included in the lens component.

Moreover, at the time of zooming from the wide angle end to the telephoto end, the first positive lens unit is stationary, the first negative lens unit moves toward the image side and comes closer to the stop, and the second positive lens unit moves toward the object side and comes closer to the stop.

The first negative lens unit and the second positive lens unit function as zooming lens units which move at the time of zooming. By disposing the stop between the first negative lens unit and the second positive lens unit, it is possible to set apart the stop appropriately from each zooming lens unit, at the wide angle end. As a result, both an effective aperture of the first negative lens and an effective aperture of the second positive lens unit are suppressed from becoming large. Moreover, since it is possible to dispose the first negative lens unit and the second positive lens unit near the stop, at the telephoto end, making such an arrangement is advantageous for securing sufficient zoom ratio. The stop is an aperture stop, and an F-number of an optical system is determined by the stop.

When the abovementioned arrangement is made, since it is possible to make each of the refractive power of the first negative lens unit and the refractive power of the second positive lens unit large, an entrance pupil is brought closer to the object side. Moreover, the zooming effect is improved by each of the first negative lens unit and the second positive lens unit. As a result, even when an angle of view of the optical system is widened, it is possible to make the diameter of the first positive lens small, and it becomes easier to secure high zoom ratio.

Moreover, the first positive lens unit is stationary not only at the time of zooming but also at the time of focusing. By making such an arrangement, it is possible to reduce a load on a drive mechanism. Furthermore, since it is possible to reduce an entry of dust into the zoom lens and an image pickup apparatus, it is possible to prevent the dust from adhering to an image pickup element. Moreover, it is possible to simplify further the layout of the optical system (lens units) in the zoom lens. As a result, it is possible to realize the image pickup apparatus of further smaller size.

The first positive lens unit includes a reflecting member having a reflecting surface which bends an optical path, and a first positive lens unit object-side system, and the first positive lens unit object-side system is positioned on the object side of the reflecting surface, and has a negative refractive power.

By letting the refractive power of the first positive lens unit object-side system to be a negative refractive power, it is possible to make the size of the reflecting member small while securing a wide angle of view at the wide angle end. Accordingly, it is possible to realize small-sizing of the first positive lens unit.

Moreover, with the zoom lens having the above-mentioned arrangement, the following conditional expressions (1), (2), and (3) are satisfied.

$$3.7 < f_t/f_w \quad (1)$$

$$1.55 < |D_{1N}/D_{2P}| < 2.5 \quad (2)$$

$$1.75 < |f_{2P}/D_{2P}| < 2.5 \quad (3)$$

where, $f_t$ denotes a focal length of the overall zoom lens system at the telephoto end, $f_w$ denotes a focal length of the overall zoom lens system at the wide angle end, and both $f_t$ and $f_w$ are focal lengths when focused to an object at infinity, and $D_{1N} = D_{1NIt} - D_{1NIw}$, $D_{2P} = D_{2PIt} - D_{2PIw}$, where $D_{1NIt}$ denotes a distance between the first negative lens unit and an image plane, at the telephoto end, $D_{1NIw}$ denotes a distance between the first negative lens unit and the image plane, at the wide angle end, $D_{2PIt}$ denotes a distance between the second positive lens unit and the image plane, at the telephoto end, and $D_{2PIw}$ denotes a distance between the second positive lens unit and the image plane, at the wide angle end, and each of $D_{1NIt}$, $D_{1NIw}$, $D_{2PIt}$, and $D_{2PIw}$ is a focal length when focused to an object at infinity, and $f_{2P}$ is a focal length of the second positive lens unit.

Conditional expression (1) is an expression which indicates the zoom ratio of the zoom lens, and which is a premise for conditional expressions (2) and (3).

The zoom lens is expected to be capable of coping with a variety of scenes of capturing. Here, for each scene of capturing, there is an angle of view which is most appropriate for capturing. By securing sufficient zoom ratio so as not to fall below a lower limit of conditional expression (1), it is possible to realize a zoom lens which is capable of coping with even larger variety of scenes of capturing.

For conditional expressions (2) and (3), a condition that the zoom lens has a zoom ratio which is not smaller than a lower limit value of conditional expression (1) is let to be a premise.

The conditional expression (2) is an expression which specifies a ratio of an amount of movement of the first negative lens unit and an amount of movement of the second positive lens unit.

By making so as not to fall below a lower limit value of conditional expression (2), it is possible to secure the amount of movement of the first negative lens unit sufficiently. Moreover, it is possible to move the first negative lens unit and the second positive lens unit such that each of the first negative lens unit and the second positive lens unit is brought closer to the stop while suppressing the amount of movement of the second positive lens unit from becoming large. Accordingly, a proportion of load of zooming in the first negative lens unit is secured appropriately, and also, the effective aperture of the second positive lens unit, which is susceptible to become large at the wide angle end, is made small. As a result, it is possible to make the effective aperture of the second positive lens unit small even when the angle of view is widened at the wide angle end. In other words, it is possible to secure a wide angle of view at the wide angle end while slimming the thickness of the zoom lens and the image pickup apparatus.

By making so as not to exceed an upper limit value of conditional expression (2), the amount of movement of the first negative lens unit is suppressed moderately from becoming large. Accordingly, the proportion of load of zooming in the first negative lens unit is suppressed from becoming excessive.

Conditional expression (3) is an expression which specifies a ratio of the focal length of the second positive lens unit and the amount of movement of the second positive lens unit.

By suppressing the refractive power of the second positive lens unit from becoming large so as not to fall below a lower limit value of conditional expression (3), a proportion of load of zooming in the second positive lens unit is suppressed from becoming excessive. As a result, a fluctuation in a spherical aberration at the time of zooming is suppressed.

By securing the refractive power of the second positive lens unit sufficiently so as not to exceed an upper limit value of conditional expression (3), it is possible to secure sufficiently the proportion of load of zooming in the second positive lens unit.

Moreover, in the zoom lens according to the present embodiment, it is preferable that the following conditional expression (4) is satisfied.

$$1.55 < |D_{1NS}/D_{2PS}| < 2.5 \quad (4)$$

where, $$D_{1NS} = D_{1NSt} - D_{1NSw}, D_{2PS} = D_{2PSt} - D_{2PSw}, \text{ where}$$

$D_{1NSt}$ denotes a distance between the first negative lens unit and the stop, at the telephoto end, $D_{1NSw}$ denotes a distance between the first negative lens unit and the stop, at the wide angle end, $D_{2PSt}$ denotes a distance between the second positive lens unit and the stop, at the telephoto end, and $D_{2PSw}$ denotes a distance between the second positive lens unit and the stop, at the wide angle end, and each of $D_{1NSt}$, $D_{1NSw}$, $D_{2PSt}$, and $D_{2PSw}$ is a focal length when focused to an object at infinity.

Conditional expression (4) is an expression which specifies a preferable ratio of an amount of change in distance between the first negative lens unit and the stop, and an amount of change in distance between the second positive lens unit and the stop.

By making so as not to fall below a lower limit value of conditional expression (4), it is possible not to let the second positive lens unit to be separated apart excessively, at the wide angle end. Accordingly, it is possible to realize making the diameter of the second positive lens unit small.

By not letting the first negative lens unit to be separated apart excessively from the stop, so as not to exceed an upper limit value of conditional expression (4), the proportion of load of zooming in the first negative lens unit is suppressed from becoming excessive.

Moreover, in the zoom lens according to the present embodiment, it is preferable that a position of the stop is fixed at the time of zooming from the wide angle end to the telephoto end.

By making such an arrangement, it is possible to simplify a drive mechanism for zooming. Moreover, it is possible to suppress an increase in weight of the lens unit which moves. Accordingly, it is possible to reduce load on the drive mechanism.

Moreover, in the zoom lens according to the present embodiment, it is preferable that the lens unit positioned nearest to the first negative lens unit, out of the lens units positioned on the image side of the first negative lens unit, is the second positive lens unit.

By making such an arrangement, it is possible to make the arrangement of the zoom lens to be an arrangement in which, no lens unit or lens is disposed between the first negative lens unit and the second positive lens unit. As a result, it is possible to reduce the number of lens units and lenses. Moreover, by making such an arrangement, it is possible to achieve both of securing sufficiently a space for movement of each of the first negative lens unit and the second positive lens unit at the time of zooming, and bringing each of the first negative lens unit and the second positive lens unit closer to the stop. Moreover, such an arrangement is advantageous for cost reduction.

In the zoom lens according to the present embodiment, it is preferable that a second negative lens unit having a negative refractive power is disposed on the image side of the second positive lens unit, and a third positive lens unit having a positive refractive power is disposed on the image side of the second negative lens unit, and at the time of zooming from the wide angle end to the telephoto end, a distance between the second positive lens unit and the second negative lens unit changes, and a distance between the second negative lens unit and the third positive lens unit changes.

By disposing the second negative lens unit on the image side of the second positive lens unit, it is possible to refract an off-axis light beam in a direction separating away from the optical axis, in the second negative lens unit. Moreover, by disposing the third positive lens unit on the image side of the second negative lens unit, it is possible to refract an off-axis light beam in a direction along the optical axis in the third positive lens unit. By making such an arrangement, it is possible to realize small-sizing of an optical system from the first positive lens unit up to the second negative lens unit.

Moreover, by making such an arrangement, the symmetry of disposition of refractive power inside the zoom lens improves. As a result, a fluctuation in off-axis aberration at the time of zooming is suppressed. It is possible to maintain a state in which, the astigmatism, the coma, and a distortion are corrected favorably at the time of zooming. Therefore, such disposition becomes all the more advantageous for widening the angle of view. Moreover, such disposition of refractive power enhances an effect such as of a telephoto type in the vicinity of the telephoto end. Therefore, such disposition becomes advantageous for shortening the overall length of the zoom lens.

Moreover, a high zooming effect is imparted to the second positive lens unit, similarly as the first negative lens unit. Consequently, a function of reducing a strong converging effect due to the second positive lens unit over the entire zooming area, and a function of relaying an image to an image plane side are imparted to the second negative lens unit. Moreover, it is possible to secure appropriately the zooming effect by the second positive lens unit and the second negative lens unit. Such disposition becomes advantageous for having a high zoom ratio, and making a diameter of a lens positioned on the image side of the second positive lens unit small.

Moreover, as the negative refractive power of the first positive lens unit object-side system becomes large, since a negative distortion which occurs in the first positive lens unit object-side system becomes large, it is preferable to reduce the negative distortion. Therefore, by disposing the second negative lens unit on the image side of the stop, it is possible to secure the negative refractive power of appropriate magnitude in the second negative lens unit. Therefore, such disposition becomes advantageous for reduction of negative distortion which occurs in the first positive lens unit object-side system.

Moreover, the third positive lens unit is positioned on the image-plane side of the second negative lens unit. Since the third positive lens unit has a positive refractive power, the third positive lens unit is capable of contributing to secure a favorable flatness of an image plane.

The third positive lens unit has a function of keeping an exit pupil away from an image pickup surface of the image pickup element. Moreover, as a shading, a shading due to characteristics of the image pickup element, and a chromatic shading are available, and by disposing the third positive lens unit, occurrence of such shading is suppressed.

By the second negative lens unit having a negative refractive power being disposed on the image side of the second positive lens unit, and the third positive lens unit having a positive refractive power being disposed on the image side of the second negative lens unit, it is possible to reduce an angle of incidence of a light ray incident on the image pickup surface of the image pickup element (to make an angle made by the optical axis and the light ray small).

Due to the effect of the second negative lens unit and the third positive lens unit, it is possible to secure a stable flatness of the image plane over the entire zooming area while having a high zoom ratio. Moreover, the second negative lens unit and the third positive lens unit, being separated away from the stop with respect to the second positive lens unit, are positioned near the image plane. Therefore, positioning of the second negative lens unit and the third positive lens unit hardly worsens the spherical aberration and the coma.

Because of the effect each of the second negative lens unit and the third positive lens unit has, it is possible to form each of the second negative lens unit and the third positive lens unit by a small number of lenses. In this case, it is possible to make the lens units light-weight. Therefore, in a case of moving the second negative lens unit and the third positive lens unit, a high-speed and stable movement of a lens unit becomes possible.

Moreover, in the zoom lens according to the present embodiment, it is preferable that the second negative lens unit moves at the time of focusing.

The second negative lens unit is a lens unit which can be made light-weight easily. Therefore, by letting the second negative lens unit to be a lens unit which moves at the time of focusing, it is possible to reduce load, such as a consumption of electric power, of the drive mechanism at the time of focusing. Moreover, since it is possible to make a drive noise which is generated from the drive mechanism at the time of focusing small, making such an arrangement becomes advantageous for reduction of noise at the time video shooting.

Moreover, as the lens unit is moved, a size of an image on the image pickup surface changes. By moving the second negative lens unit at the time of focusing, a fluctuation in the size of the image is suppressed.

Moreover, as aforementioned, the second negative lens unit and the third positive lens unit have characteristics such as of being capable of securing stable flatness of the image plane over the entire zooming area even while having a high zoom ratio, hardly worsening the spherical aberration and the coma, and including small number of lenses. Therefore, in a case of moving a lens unit with a purpose other than of zooming, taking into consideration an effect of the lens unit and an effect on aberration fluctuation, it is preferable to move the second negative lens unit. By doing so, it is possible to secure optical performance with small aberration fluctuation at the time of focusing. Particularly, it becomes easy to secure the optical performance at a close distance, such as the fluctuation in the spherical aberration and the coma is small.

Moreover, in the zoom lens according to the present embodiment, it is preferable that a position of the second negative lens unit at the telephoto end is more toward the second positive lens unit than a position of the second negative lens unit at the wide angle end, and the third positive lens unit is stationary at the time of zooming from the wide angle end to the telephoto end.

By making such an arrangement, a fluctuation in a curvature of field is suppressed. Moreover, by letting the third positive lens unit to be stationary, since it is possible to reduce dust entering into the image pickup apparatus, it is possible to prevent the dust from being deposited on the image pickup element.

Moreover, it is preferable that the zoom lens according to the present embodiment is a five unit zoom lens which includes in order from the object side to the image side, the first positive lens unit, the first negative lens unit, the second positive lens unit, the stop, the second negative lens unit, and the third positive lens unit.

Making such an arrangement is advantageous for small-sizing and improvement in performance of the zoom lens.

Moreover, in the zoom lens according to the present embodiment, it is preferable that the first positive lens unit includes in order from the object side, a negative lens component, the reflecting member, and a positive lens component, and the negative lens component is the first positive lens unit object-side system, and in the negative lens component, the shape of the image-side surface is a concave shape, and the positive lens component is a first positive lens unit image-side system, and the first positive lens unit image-side system is positioned on the image side of the reflecting surface, and in the positive lens component, both the shape of the object-side surface and the shape of the image-side surface are convex shapes, and the reflecting member is made of a prism.

By making such an arrangement, it is possible to secure a wide angle of view and to make the first positive lens unit small.

Disposing the negative lens component (the first positive lens unit object-side system) on the object side is advantageous for securing a wide angle of view at the wide angle end. Moreover, by disposing the positive lens component on the image side, it is possible to secure a positive refractive power of appropriate magnitude in the first positive lens unit. According to such an arrangement, it is possible to make a space for disposing the prism (reflecting member) small.

For widening the angle of view of the optical system and bending the optical path in the first positive lens unit, it is necessary to secure an optical length required for bending the optical path, between the negative lens component and the positive lens component. For this, it is preferable to make the negative refractive power of the negative lens component large as well as to make the positive refractive power of the positive lens component large.

Here, as the reflecting surface, a reflecting surface in a state of making contact with air, and a reflecting surface provided to the prism are available. In a state of the reflecting surface making contact with air, a distance between the negative lens component and the positive lens component becomes wider as compared to the distance in a case in which the reflecting surface is provided to the prism. Therefore, in the state of the reflecting surface making contact with air, it is necessary to make the refractive power of the negative lens component and the refractive power of the positive lens component larger as compared to the refractive power in the case in which, the reflecting surface is provided to the prism.

As aforementioned, making the negative refractive power of the negative lens component large is favorable for widening the angle of view, and making the positive refractive power of the positive lens component large is favorable for securing an appropriate positive refractive power in the first positive lens unit. However, when each of the refractive power of the negative lens component and the refractive power of the positive lens component becomes large, the astigmatism and a chromatic aberration of magnification become large in each of the negative lens component and the positive lens component. In this case, it is possible to cancel (to correct) each aberration to a certain degree in the negative lens component and the positive lens component.

When the refractive power of the negative lens component and the refractive power of the positive lens component become further larger, it becomes difficult to cancel the astigmatism and the chromatic aberration of magnification in each of the negative lens component and the positive lens component. Therefore, the astigmatism and the chromatic aberration of magnification in the vicinity of the wide angle end are susceptible to remain. Moreover, when the negative refractive power of the negative lens component is made large, the chromatic aberration of magnification of the negative lens component in the vicinity of the telephoto end becomes large. Here, since the chromatic aberration of magnification has an effect on an amount of a longitudinal chromatic aberration, it is preferable to carry out aberration correction while taking into consideration the effect on the longitudinal chromatic aberration (balance with the longitudinal chromatic aberration). However, in the state of the reflecting surface making contact with air, correction of these aberrations becomes difficult.

Therefore, the reflecting member is disposed between the negative lens component and the positive lens component, and the reflecting surface is let to be the prism. By making such an arrangement, it is possible to reduce the occurrence of the astigmatism and the chromatic aberration of magnification in the vicinity of the wide angle end, in the negative lens component, while securing the optical path length necessary for bending the optical path.

Moreover, by using the prism, it is possible to cause the longitudinal chromatic aberration in the vicinity of the telephoto end to occur on a negative side. Therefore, even if the longitudinal chromatic aberration remains after the correction of the chromatic aberration of magnification is carried out in the negative lens component and the positive lens component, correction of the longitudinal chromatic aberration remained is possible by using the negative longitudinal chromatic aberration occurring in the prism.

It is preferable that no lens (lens unit) has been disposed on the object side of the negative lens component. When such an arrangement is made, even if the prism is disposed in the first positive lens unit, it is possible to slim further the thickness of the zoom lens and the image pickup apparatus.

Moreover, in the zoom lens according to the present embodiment, it is preferable that the first positive lens unit satisfies the following conditional expression (5).

$$0.5 < D_{1PN1PP}/f_{1P} < 1.0 \quad (5)$$

where, $D_{1PN1PP}$ denotes a distance along an optical axis between the negative lens component in the first positive lens unit and the positive lens component in the first positive lens unit, and $f_{1P}$ denotes a focal length of the first positive lens unit.

By making so as not to fall below a lower limit value of conditional expression (5), it is possible to secure a space for disposing the reflecting member. By making so as not to exceed an upper limit value of conditional expression (5), it becomes easy to reduce various aberrations.

Moreover, in the zoom lens according to the present embodiment, it is preferable that both the object-side surface and the image-side surface of the positive lens component in the first positive lens unit are aspheric surfaces.

If the positive refractive power of the first positive lens unit is made large, the spherical aberration and the coma are susceptible to occur. Therefore, by making such an arrangement, it is possible to reduce an amount of the spherical aberration and coma which occur.

Moreover, in the zoom lens according to the present embodiment, it is preferable that the first negative lens unit includes a negative lens component which is disposed nearest to the object side, and a positive lens component which is disposed nearest to the image side, and in the negative lens component disposed nearest to the object side in the first negative lens unit, both a shape of the object-side surface and a shape of the image-side surface are concave surfaces.

By making such an arrangement, principal points of the first negative lens unit are brought closer to the first positive lens unit. Accordingly, it is possible to secure a zooming function in the first negative lens unit easily. Moreover, making such an arrangement becomes advantageous for correction of various aberrations such as a chromatic aberration.

When each of the negative refractive power of the negative lens component in the first positive lens unit and the positive refractive power of the positive lens component in the first positive lens unit are made large, thereby widening the angle of view of the optical system, light with a large angle of incidence is incident on the zoom lens. As the light with large angle of incidence is incident on the zoom lens, when the light with the large angle of incidence is emerged from the first positive lens unit in the vicinity of the wide angle end, angle made by the light emerged with respect to the optical axis becomes extremely large. Therefore, it is preferable to dispose the negative lens component nearest to the object side in the first negative lens unit. Accordingly, it is possible to make the angle of emergence of the light emerged small. Making such an arrangement is advantageous for making a diameter of the lens units which are on the image side of the first negative lens unit small.

Furthermore, it is preferable to dispose a positive lens component at a distance, on the image side of the negative lens unit, in the first negative lens unit. When such an arrangement is made, in a case in which, an aspheric surface is used, it is possible to show even more favorable correction effect. It is preferable to dispose the positive lens component nearest to the image side.

In the zoom lens according to the present embodiment, it is preferable that both the object-side surface and the image-side surface of the negative lens component disposed nearest to the object side in the first negative lens unit are aspheric surfaces, and the image-side surface of the positive lens component disposed nearest to the image side in the first negative lens unit is an aspheric surface.

Making such an arrangement is advantageous for correction of both the off-axis aberration at the wide angle side and the spherical aberration at the telephoto side. In the first negative lens unit, a light beam is narrowed at the telephoto end, and a light beam is widened at the wide angle end. Therefore, out of the lens surfaces of the first negative lens unit, lens surfaces through which, the light beam passes through a position away from the optical axis, or in other words, both surfaces of the negative lens component disposed nearest to the object side are to be let to be aspheric surfaces. Moreover, these aspheric surfaces are to be used for correction of the longitudinal aberration at the wide angle side. By doing so, a function of correcting aberration is improved in the first negative lens unit.

For making light with a large angle of incidence to be incident on the zoom lens, it is preferable to make the negative refractive power of the negative lens component disposed nearest to the object side in the first negative lens unit large. However, if the negative refractive power of the negative lens component is made large, mainly, positive spherical aberration is susceptible to occur in the vicinity of the telephoto end, and the curvature of field is susceptible to occur in the vicinity of the wide angle end. Therefore, by using the aspheric surface for both surfaces (the object-side surface and the image-side surface) of the negative lens component, the occurrence of the spherical aberration and the curvature of field, is suppressed.

Moreover, in the zoom lens according to the present embodiment, it is preferable that the positive lens component disposed nearest to the image side in the first negative lens unit is a single lens, and the single lens satisfies the following conditional expression (6).

$$\nu_{1NP} < 29 \quad (6)$$

where, $\nu_{1NP}$ denotes Abbe's number for a d-line of the single lens.

If conditional expression (6) is satisfied, a glass material to be used for the single lens is a material for which, Abbe's number is small. Therefore, by cancelling (reducing) the chromatic aberration of the first negative lens unit using the single lens, it is possible to reduce the chromatic aberration of the first negative lens unit.

Moreover, in the zoom lens according to the present embodiment, it is preferable that the positive lens component disposed nearest to the image side in the first negative lens unit is a cemented lens, and the cemented lens includes in order from the object side, a biconvex positive lens and a negative meniscus lens.

By making such an arrangement, it is possible to correct the coma and the chromatic aberration favorably.

Moreover, in the zoom lens according to the present embodiment, it is preferable that the second positive lens unit includes in order from the object side, a positive lens component and a cemented lens, and in the positive lens component of the second positive lens unit, both a shape of the object-side surface and a shape of the image-side surface are convex shapes, and the cemented lens in the second positive lens unit includes in order from the object side, a negative lens having a concave surface directed toward the image side, and a biconvex positive lens.

A diverged axial light beam is incident on the second positive lens unit. Therefore, the axial light beam is converged by disposing the positive lens component on the object side in the second positive lens unit. By doing so, it is possible to make the diameter of the second positive lens unit small. Moreover, the cemented lens is disposed on the image side of the positive lens component, and the cemented lens includes the negative lens and the biconvex positive lens. By making such an arrangement, it is possible to reduce occurrence of the chromatic aberration and other aberrations in the second positive lens unit.

Moreover, in the zoom lens according to the present embodiment, it is preferable that both the object-side surface and the image-side surface of the positive lens component in the second positive lens unit are aspheric surfaces.

By making such an arrangement, it is possible to correct the spherical aberration, and the coma at the wide angle end.

Moreover, in the zoom lens according to the present embodiment, it is preferable that the second negative lens unit includes one negative lens component, and in the negative lens component of the second negative lens unit, a shape of the image-side surface is a concave shape.

By making such an arrangement, the cost reduction and small-sizing of the zoom lens and the image pickup apparatus are possible.

In the second negative lens unit, even in a case in which, functions such as a relay of an image, small-sizing, and aberration correction, it is possible to form the second negative lens unit by one negative lens. In this case, it is desirable to make the chromatic aberration which occurs in the second negative lens unit small.

Moreover, in the zoom lens according to the present embodiment, it is preferable that the third positive lens unit includes one positive lens component, and in the positive lens component in the third positive lens unit, both a shape of the object-side surface and a shape of the image-side surface are convex shapes.

By making such an arrangement, the cost reduction and small-sizing of the zoom lens and the image pickup apparatus are possible.

Moreover, in the zoom lens according to the present embodiment, it is preferable that both the object-side surface and the image-side surface of the positive lens component in the third positive lens unit are aspheric surfaces.

By making such an arrangement, it is possible to correct mainly the off-axis aberration favorably.

In the zoom lens according to the present embodiment, it is preferable that the first positive lens unit includes a first positive lens unit image-side system which is positioned on the image side of the reflecting surface, and the following conditional expression (7) is satisfied.

$$4.5 \leq |f_{1Po}| \times f_{1Pi}/IH_t^2 \leq 7.5 \quad (7)$$

where, $f_{1Po}$ denotes a focal length of the first positive lens unit object-side system, $f_{1Pi}$ denotes a focal length of the first positive lens unit image-side system, and $IH_t$ denotes the maximum image height when focused to an object at infinity, at the telephoto end.

For securing the wide angle of view at the wide angle end, it is necessary to secure an incidence of light having a large angle of incidence on the zoom lens. Moreover, shortening the overall length of the zoom lens while maintaining a high zoom ratio is desirable for the zoom lens. Furthermore, shortening of the overall length of the zoom lens is favorable also for slimming of the image pickup apparatus.

For realizing the widening of the angle of view, achieving a high zooming ratio, and shortening the overall length of such zoom lens, it is preferable to make the negative refractive power of the first positive lens unit object-side system large, as well as to make the positive refractive power of the first positive lens unit large. Here, if the positive refractive power of the first positive lens unit is made large, at the telephoto end, the optical arrangement of the overall zoom lens becomes an arrangement such as of a telephoto type. As a result, an effect of shortening the overall length of the zoom lens is improved. Therefore, it is preferable to improve further the effect of shortening the overall length of the zoom lens by making the positive refractive power of the first positive lens unit large. Conditional expression (7) is a condition which is preferable for maintaining the favorable optical performance while improving the effect of shortening the overall length of the zoom lens.

By making so as not to fall below a lower limit value of conditional expression (7), it is possible to reduce the chromatic aberration of magnification and the astigmatism in the vicinity of the wide angle end in each of the first positive lens unit object-side system and the first positive lens unit image-side system even if the overall length of the zoom lens is shortened. Particularly, it is possible to reduce the chromatic aberration of magnification and the astigmatism in the vicinity of the wide angle end. Moreover, since the chromatic aberration of magnification is suppressed from becoming large rapidly in a peripheral portion of an image field, it becomes easy to achieve an image in which, chromatic blurring is reduced.

Moreover, in the vicinity of the telephoto end, various aberrations, to be more precise, the negative spherical aberration, the negative astigmatism, and the positive distortion are susceptible to occur. Therefore, by making so as not to fall below the lower limit value of conditional expression (7), the occurrence of aberrations is suppressed. Moreover, since the spherical aberration is suppressed from becoming negative substantially in the vicinity of the telephoto end, it is possible to improve performance in the vicinity of the center of the image. It becomes easy to suppress the occurrence of the positive distortion.

By making so as not to exceed an upper limit value of conditional expression (7), it is possible to shorten the overall length of the zoom lens upon securing the high zoom ratio and the positive refractive power of appropriate magnitude in the first positive lens unit. Moreover, since it is possible to make the negative refractive power of the first positive lens unit object-side system large, it is possible to secure a wide angle of view at the wide angle end, and it is possible to make the space for disposing the reflecting member small, thereby making small-sizing of the overall image pickup apparatus possible.

Moreover, in the zoom lens according to the present embodiment, it is preferable that the reflecting member is a prism, and the following conditional expressions (8) and (9) are satisfied.

$$0.7 \leq \tan \omega_w - (L_{pri}/L_w) \leq 1.3 \quad (8)$$

$$3.5 \leq DT/(f_{1Po}/IH_t) \leq 16 \quad (9)$$

where, $\omega_w$ denotes the maximum half angle of view when focused to an object at infinity, at the wide angle end, $L_{pri}$ denotes a total length of the prism along an optical axis, and the total length of the prism is a distance from an optical surface of the prism on the object side of the reflecting surface, up to an optical surface of the prism on the image side of the reflecting surface, $L_w$ denotes a distance which added an air-converted back-focus length to a total length of the overall zoom lens system along the optical axis, and is a distance when focused to an object at infinity, at the wide angle end, and the total length of the overall zoom lens system is a distance from a lens surface nearest to the object side of the zoom lens, up to a lens surface nearest to the image-side surface of the zoom lens, and $$DT = (IH_w - f_w \times \tan \omega_w)/(f_w \times \tan \omega_w) \times 100, \text{ and the unit is percentage, and}$$

$f_{1Po}$ denotes a focal length of the first positive lens object-side system, $IH_t$ denotes the maximum image height when focused to an object at infinity, at the telephoto end, $IH_w$ denotes the maximum image height when focused to an object at infinity, at the wide angle end, and $f_w$ denotes a focal length of the overall zoom lens system when focused to an object at infinity, at the wide angle end.

By using a prism for the reflecting member, the longitudinal chromatic aberration is made to occur on the negative side in the vicinity of the telephoto end. Therefore, even if the longitudinal chromatic aberration remains after carrying out correction of the chromatic aberration of magnification in the first positive lens unit object-side system and the first positive lens unit image-side system, it is possible to correct the longitudinal chromatic aberration remained, by using the negative longitudinal chromatic aberration occurring in the prism.

Conditional expression (8) is a conditional expression which is favorable for accommodating an amount of negative longitudinal chromatic aberration in the vicinity of the telephoto end occurred in the prism, an amount of astigmatism and longitudinal chromatic aberration occurred in the vicinity of the wide angle end, and an amount of distortion occurred in an acceptable range, while securing a high zoom ratio.

By suppressing the overall length of the prism with respect to the angle of view from becoming long so as not to fall below a lower limit value of conditional expression (8), it is possible to make an appropriate amount of the longitudinal chromatic aberration occur in the prism. Accordingly, it is possible to reduce the longitudinal chromatic aberration in the vicinity of the telephoto end. Moreover, since it is possible to make a distance between the first positive lens unit object-side system and the first positive lens unit image-side system, and the refractive power of each of the first positive lens unit object-side system and the first positive lens unit image-side system appropriate, it is possible to carry out aberration correction effectively. By making so as not to exceed an upper limit value of conditional expression (8), it is possible to reduce the distortion.

Moreover, there is a peculiarity that the distortion becomes large in proportion to cube of the angle of view, and the astigmatism becomes large in proportion to square of the angle of view. Making the negative distortion large in the vicinity of the wide angle end, or in other words, allowing the negative distortion to occur to some extent is advantageous for securing the flatness of image plane at the time of widening the angle of view. In this case, by making the amount of distortion occurring in the first positive lens unit object-side system an appropriate amount (within a permissible range), the negative aberration amount of the longitudinal chromatic aberration in the vicinity of the telephoto end is let to be an appropriate amount, and moreover, it is possible to correct favorably the astigmatism and the chromatic aberration of magnification in the vicinity of the wide angle end. Moreover, as the negative refractive power of the first positive lens unit object-side system is made larger gradually, it leads to widening of the angle of view and small-sizing of the reflecting member, and conditional expression (9) is an expression in which, this feature is specified. By satisfying conditional expression (9), it is possible to achieve both, the realization of improved optical performance, and small sizing.

By making so as not to fall below a lower limit value of conditional expression (9), it is possible to secure appropriately (within a permissible range) the amount of negative distortion that occurs in the first positive lens unit object-side system. Therefore, it is possible to carry out small-sizing of the reflecting member.

By making so as not to exceed an upper limit value of conditional expression (9), the amount of negative distortion occurring in the first positive lens unit object-side system is suppressed from becoming excessive, and also, it is possible to correct favorably the astigmatism that occurs in the first positive lens unit object-side system. Moreover, even in a case in which, electrical distortion correction has been carried out, degradation of resolving power is suppressed.

Moreover, in the zoom lens according to the present embodiment, it is preferable that the following conditional expressions (10) and (11) are satisfied.

$$4.2 \leq |(f_{1Po}/IH_t) \times (f_{1P}/IH_t)/\tan \omega_w| \leq 11.6 \quad (10)$$

$$5.6 \leq |(f_{1Po}/f_w) \times (f_{1P}/f_w)| \leq 11.5 \quad (11)$$

where, $f_{1Po}$ denotes a focal length of the first positive lens unit object-side system, $f_{1P}$ denotes a focal length of the first positive lens unit, $IH_t$ denotes the maximum image height when focused to an object at infinity, at the telephoto end, $\omega_w$ denotes the maximum half angle of view when focused to an object at infinity, at the wide angle end, and $f_w$ denotes a focal length of the overall zoom lens system when focused to an object at infinity, at the wide angle end.

As aforementioned, for realizing the widening of angle of view, it is preferable to make the negative refractive power of the first positive lens unit object-side system large. Moreover, for achieving high zoom ratio and shortening of the overall length, it is preferable to make the positive refractive power of the first positive lens unit large, and to make an arrangement such that the optical arrangement of the overall zoom lens is an arrangement such as of a telephoto type, at the telephoto end.

Moreover, as the angle of view becomes wider gradually, the negative refractive power of the first positive lens unit object-side system becomes larger. Therefore, it is preferable to carry out correction of the astigmatism and the chromatic aberration of magnification that occurs in the first positive lens unit object-side system. Consequently, setting appropriately the balance of the refractive power of the first positive lens unit object-side system and the refractive power of the first positive lens unit with respect to the angle of view is advantageous for achieving both, the realization of the improved optical performance and small-sizing.

Conditional expression (10) and (11) signify that both the refractive power of the first positive lens unit object-side system and the refractive power of the first positive lens unit are to be made large.

By making so as not fall below a lower limit value of conditional expression (10) and a lower limit value of conditional expression (11), the refractive power of the first positive lens unit is suppressed from becoming excessively large, an also it is possible to reduce the occurrence of the astigmatism and the chromatic aberration of magnification in each of the first positive lens unit object-side system and the first positive lens unit image-side system. It is possible to reduce the astigmatism and the chromatic aberration of magnification particularly in the vicinity of the wide angle end. Moreover, since the chromatic aberration of magnification is suppressed from becoming large rapidly in the peripheral portion of the image field, it becomes easy to achieve an image in which, chromatic blurring is reduced.

By making so as not to fall below the lower limit value of conditional expression (10) and the lower limit value of conditional expression (11), various aberrations, to be precise, the negative spherical aberration, the negative astigmatism, and the positive distortion, which occur in the first positive lens unit image-side system in the vicinity of the telephoto end, are suppressed from being corrected excessively. Moreover, since the spherical aberration is suppressed from becoming negative substantially in the vicinity of the telephoto end, it is possible to improve the performance in the vicinity of the center of the image. Also, it becomes easy to suppress the occurrence of the positive distortion.

By making so as not to exceed an upper limit value of conditional expression (10) and an upper limit value of conditional expression (11), it is possible to secure the positive refractive power of an appropriate magnitude in the first positive lens unit, and to shorten the overall length of the zoom lens in addition to securing high zoom ratio. Since it is possible to make the negative refractive power of the first positive lens unit object-side system large, it is possible to secure a wide angle of view at the wide angle end, and to make the space for disposing the reflecting member small, thereby making small-sizing of the overall image pickup apparatus possible.

In the zoom lens according to the present embodiment, it is preferable that the following conditional expression (12) is satisfied.

$$1.0 \leq |(f_{1Po}/IH_t)/(\tan \omega_w)^2| \leq 3.7 \quad (12)$$

where, $f_{1Po}$ denotes a focal length of the first positive lens unit object-side system, $IH_t$ denotes the maximum image height when focused to an object at infinity at the telephoto end, and $\omega_w$ denotes the maximum angle of view when focused to an object at infinity at the wide angle end.

Conditional expression (12) is a preferable condition for securing a wide angle of view, and to achieve a favorable optical performance with a high zoom ratio and a small size.

By making so as not to fall below a lower limit value of conditional expression (12), the negative refractive power of the first positive lens unit object-side system is suppressed from becoming excessively large. In this case, since a large negative distortion is suppressed from occurring in the first positive lens unit object-side system, it becomes easy to carry out correction of distortion in other lenses. Moreover, by making the distortion that remains small, degradation of resolving power is suppressed even in a case in which, electrical distortion correction has been carried out.

By making so as not to exceed an upper limit of conditional expression (12), for the first positive lens unit object-side system, it is possible to secure the negative refractive power of appropriate magnitude. Therefore, it is possible to widen the angle of view. Moreover, the negative refractive power of the overall zoom lens is shared also by the first negative lens unit. Therefore, since an increase in the share of the negative refractive power (the negative refractive power becoming excessively large) of the first negative lens unit due to the widening of the angle of view can be suppressed if the negative refractive power can be made an appropriate magnitude in the first positive lens unit object-side system, it is possible to achieve both, the shortening of the overall length of the zoom lens and a high zoom ratio. Moreover, by reducing the share of the negative refractive power of the first negative lens unit, since it becomes easy to reduce tilting of an image plane due to decentering of the first negative lens unit, it becomes easy to achieve a stable optical system.

Moreover, in the zoom lens according to the present embodiment, it is preferable that the reflecting member is a prism, and the following conditional expression (13) is satisfied.

$$1.5 \leq (L_{pri}/IH_t) \times (f_w/IH_t)/\tan \omega_w \leq 2.8 \quad (13)$$

where, $L_{pri}$ denotes a total length of the prism along an optical axis, and the total length of the prism is a distance from an optical surface of the prism on the object side of the reflecting surface, up to an optical surface of the prism on the image side of the reflecting surface, IH$_t$ denotes the maximum image height when focused to an object at infinity, at the telephoto end, f$_w$ denotes a focal length of the overall zoom lens system when focused to an object at infinity, at the wide angle end, and ω$_w$ denotes the maximum half angle of view when focused to an object at infinity, at the wide angle end.

By making so as not to fall below a lower limit value of conditional expression (13), the refractive power of the lens system on the object side of the stop (refractive power of the first positive lens unit object-side system and refractive power of the first negative lens unit) is suppressed from becoming large at the wide angle end, and it is possible to reduce the negative distortion, and to shorten the overall length of the zoom lens. Moreover, by reduction of the negative distortion, the degradation of the resolving power in a case in which, the correction of distortion has been carried out electrically, is suppressed.

By making so as not to exceed an upper limit value of conditional expression (13), it is possible to make an optical path length inside the prism short, and to slim the thickness of the prism.

Moreover, in the zoom lens according to the present embodiment, it is preferable that the following conditional expression (14) is satisfied.

$$1.2 \leq |f_{1Po}/IH_t| \leq 3.6 \quad (14)$$

where, f$_{1Po}$ denotes a focal length of the first positive lens unit object-side system, and IH$_t$ denotes the maximum image height when focused to an object at infinity, at the telephoto end.

Furthermore, setting appropriately the magnitude of the refractive power of the first positive lens unit object-side system becomes advantageous for widening the angle of view. Conditional expression (14) is a conditional expression to set appropriately the magnitude of the refractive power of the first positive lens unit object-side system.

By making so as not to fall below a lower limit value of conditional expression (14), the negative distortion is suppressed from occurring substantially when the optical system is subjected to the widening of the angle of view.

By making so as not to exceed an upper limit value of conditional expression (14), it is possible to secure a wide angle of view. Or, since it becomes easy to suppress the negative refractive power of the first negative lens unit to a suitable magnitude, it becomes easy to correct favorably the curvature of field over the entire zooming area even when the zoom ratio is made high.

Moreover, in the zoom lens according to the present embodiment, it is preferable that the following conditional expression (15) is satisfied.

$$\omega_w \geq 42° \quad (15)$$

where

ω$_w$ denotes the maximum half angle of view when focused to an object at infinity at the wide angle end.

By satisfying the conditional expression (15), it is possible to secure a wide angle of view sufficiently at the wide angle end. Accordingly, wide-angle capturing in a narrow space becomes possible.

Moreover, the image pickup apparatus according to the present embodiment includes the abovementioned zoom lens, and an image pickup element which converts an image formed by the zoom lens to an electric image.

It is possible to realize an image pickup apparatus which is capable of coping with scenes of capturing of wider range.

It is more preferable that each of the above-mentioned arrangement satisfies the plurality of arrangements and conditional expressions simultaneously. Moreover, a rectangular prism can be used for the prism.

In each of the abovementioned conditional expressions, by restricting either of the lower limit value and the upper limit value, or both the lower limit value and the upper limit value, that function can be realized more assuredly, and therefore it is favorable.

For conditional expression (1), it is more preferable to let the lower limit value to be 4.1, and 4.7 is even more preferable. Moreover, it is preferable to set an upper limit value, and to let the upper limit value to be 20. By making so as not to exceed the upper limit value, it becomes easy to reduce an aberration over the entire zooming area. Furthermore, it is more preferable to let the upper limit value to be 10, and 7 is even more preferable. Making such an arrangement is advantageous for achieving both the small-sizing and improved performance of the zoom lens.

For conditional expression (2), it is more preferable to let the lower limit value to be 1.65, and 1.69 is even more preferable.

Moreover, for conditional expression (2), it is more preferable to let the upper limit value to be 2.4, and 2.3 is even more preferable.

For conditional expression (3), it is more preferable to let the lower limit value to be 1.8.

Moreover, for conditional expression (3), it is more preferable to let the upper limit value to be 2.3, and 2.2 is even more preferable.

For conditional expression (4), it is more preferable to let the lower limit value to be 1.65, and 1.69 is even more preferable.

Moreover, for conditional expression (4), it is more preferable to let the upper limit value to be 2.4, and 2.3 is even more preferable.

For conditional expression (5), it is more preferable to let the lower limit value to be 0.66, and 0.76 is even more preferable.

Moreover, for conditional expression (5), it is more preferable to let the upper limit value to be 0.92, and 0.86 is even more preferable.

For conditional expression (6), it is more preferable to let the upper limit value to be 27, and 25 is even more preferable.

For conditional expression (7), it is more preferable to let the lower limit value to be 5.3, and 5.8 is even more preferable.

Moreover, for conditional expression (7), it is more preferable to let the upper limit value to be 7.1, and 6.8 is even more preferable.

For conditional expression (8), it is more preferable to let the lower limit value to be 0.78, and 0.83 is even more preferable.

Moreover, for conditional expression (8), it is more preferable to let the upper limit value to be 1.1, and 0.88 is even more preferable.

For conditional expression (9), it is more preferable to let the lower limit value to be 5.5, and 6.0 is even more preferable.

Moreover, for conditional expression (9), it is more preferable to let the upper limit value to be 10.0, and 7.0 is even more preferable.

For conditional expression (10), it is more preferable to let the lower limit value to be 5.4, and 7.4 is even more preferable.

Moreover, for conditional expression (10), it is more preferable to let the upper limit value to be 10.0, and 9.2 is even more preferable.

For conditional expression (11), it is more preferable to let the lower limit value to be 6.6, and 7.6 is even more preferable.

Moreover, for conditional expression (11), it is more preferable to let the upper limit value to be 10.0, and 9.0 is even more preferable.

For conditional expression (12), it is more preferable to let the lower limit value to be 1.9, and 2.3 is even more preferable.

Moreover, for conditional expression (12), it is more preferable to let the upper limit value to be 3.2, and 2.7 is even more preferable.

For conditional expression (13), it is more preferable to let the lower limit value to be 1.8, and 2.0 is even more preferable.

Moreover, for conditional expression (13), it is more preferable to let the upper limit value to be 2.4, and 2.2 is even more preferable.

For conditional expression (14), it is more preferable to let the lower limit value to be 1.8, and 2.4 is even more preferable.

Moreover, for conditional expression (14), it is more preferable to let the upper limit value to be 3.0, and 2.7 is even more preferable.

For conditional expression (15), it is more preferable to let the lower limit value to be 44°.

Moreover, for conditional expression (15), it is preferable to set an upper limit value, and to let the upper limit value to be 60°. Making an arrangement so as not to exceed the upper limit value of conditional expression (15) is advantageous for reducing the distortion and securing off-axis incident light. Furthermore, it is even more preferable to let the upper limit value of conditional expression (15) to be 50°.

The abovementioned zoom lens and image pickup apparatus may satisfy the plurality of arrangements simultaneously. This is preferable for achieving a favorable zoom lens and image pickup apparatus. Moreover, combinations of preferable arrangements are arbitrary. For each conditional expression, only an upper limit value and a lower limit value of a numerical range of a conditional expression further restricted, may be restricted.

Figure 13:
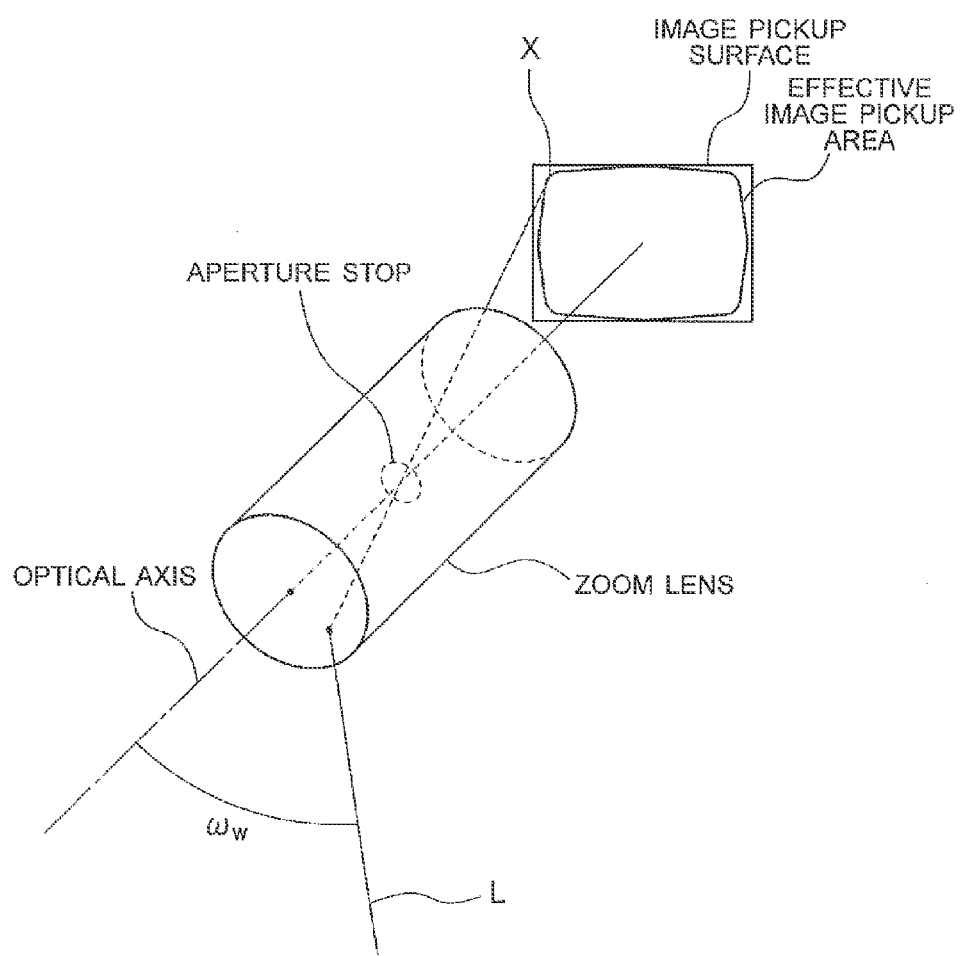
FIG. 13 is a diagram for explaining $\omega_w$.

$\omega_w$ (the maximum half angle of view when focused to an object at infinity at the wide angle end) will be described by using FIG. 13. In FIG. 13, as to how, a zoom lens, an aperture stop, and an image pickup surface are arranged on an optical axis is shown. A light ray which is incident on the zoom lens, upon passing through the aperture stop, is emerged from the zoom lens, and reaches the image pickup surface.

In FIG. 13, a light ray L shown by a solid line indicates a light ray which reaches a point X on an effective image pickup area, from among light rays which pass through the center of the aperture stop. The point X is a position farthest from the optical axis in the effective image pickup area. Here, the effective image pickup area being an area, in which an object image is formed, the point X becomes the maximum image-height position. In such manner, the light ray L is a light ray which passes through the aperture stop, and which is incident on the maximum image-height position. Moreover, ωw is a half angle of view with respect to an optical axis of light ray L, at the wide angle end.

Examples of a zoom lens to be used in the image pickup apparatus according to the present invention will be described below in detail by referring to the accompanying diagrams. However, the present invention is not restricted to the examples described below.

Examples from an example 1 to an example 6 of the zoom lens will be described below. Lens cross-sectional views of examples from the example 1 to the example 6 are shown in diagrams from FIG. 1A, FIG. 1B, and FIG. 1C to FIG. 6A, FIG. 6B, and FIG. 6C. In these diagrams, FIG. 1A, FIG. 2A, FIG. 3A, FIG. 4A, FIG. 5A, and FIG. 6A are cross-sectional views at a wide angle end, FIG. 1B, FIG. 2B, FIG. 3B, FIG. 4B, FIG. 5B, and FIG. 6B are cross-sectional views in an intermediate focal length state, and FIG. 1C, FIG. 2C, FIG. 3C, FIG. 4C, FIG. 5C, and FIG. 6C are cross-sectional views at a telephoto end. Each of FIG. 1A, FIG. 1B, and FIG. 1C to FIG. 6A, FIG. 6B, and FIG. 6C is a lens cross-sectional view when focused at an object at infinity.

Moreover, a first lens unit is denoted by G1, a second lens unit is denoted by G2, an aperture stop is denoted by S, a third lens unit is denoted by G3, a fourth lens unit is denoted by G4, a fifth lens unit is denoted by G5, a flat and parallel plate of a cover glass of an electronic image pickup element is denoted by C, and an image plane is denoted by I. A multilayer film for restricting wavelength region may be applied to a surface of the cover glass C. The cover glass C may be imparted an effect of a low-pass filter.

In examples from the example 1 to the example 6, a reflecting surface is provided to a rectangular prism. The reflecting surface is a flat surface and is disposed between an object-side refracting surface and an image-side refracting surface of the prism on an optical axis, to be inclined by roughly 45 degrees with respect to an optical axis. Moreover, since the reflecting surface reflects light that passes through an interior of the prism, the reflecting surface is a back-surface reflecting surface. Therefore, the prism is a back-surface reflecting prism. The reflecting surface is not shown in the diagram, and numerical data of the reflecting surface is omitted. The object-side refracting surface and the image-side refracting surface of the prism are shown in the diagram, and numerical data thereof is shown.

An image pickup element is disposed on the image plane I. In a case in which, an image pickup area on the image pickup element is substantially rectangular-shaped, it is preferable to dispose the image pickup element such that a direction of a narrow side of the image pickup area and an optical axis of light incident on the zoom lens are almost parallel. Making such an arrangement is advantageous for small-sizing of the zoom lens in an optical axial direction of the light incident on the zoom lens, and leads to slimming of the image pickup apparatus.

In the zoom lenses in examples from the example 1 to the example 6, an image height in the intermediate focal length state and at the telephoto end is same, and the image height at the wide angle end is smaller as compared to the image height in the intermediate focal length state and the image height at the telephoto end. This is because an image at the wide angle end is let to have a barrel shape, and the distortion is corrected by converting the barrel-shaped image to a rectangular-shaped image electrically. Details of the electrical distortion correction will be omitted.

Zoom lenses of examples from the example 1 to the example 6 include a first positive lens unit having a positive refractive power, a first negative lens unit having a negative refractive power, a stop, and a second positive lens unit having a positive refractive power. The first positive lens unit and the first negative lens unit are disposed in order of the first positive lens unit and the first negative lens unit from an object side to an image side. The second positive lens unit is disposed on the image side of the first negative lens unit, and the stop is disposed between the first negative lens unit and the second positive lens unit. At the time of zooming from the wide angle end to the telephoto end, the first positive lens unit is stationary, the first negative lens unit moves toward the image side, and the second positive lens unit moves toward the object side.

In the zoom lenses of examples from the example 1 to the example 6, an order of arrangement of the refractive power (including the stop S) is positive refractive power, negative refractive power, S, positive refractive power, negative refractive power, and positive refractive power. Here, the first positive lens unit is the first lens unit G1, the first negative lens unit is the second lens unit G2, and the second positive lens unit is the third lens unit G3.

By making such an arrangement, in the examples from the example 1 to the example 6, shortening the overall length of the zoom lens and securing a high zoom ratio is achieved. Moreover, since the arrangement improves symmetry of order of arrangement of the refractive power, it becomes easy to maintain a state in which, a fluctuation in the off-axis aberration at the time of zooming, particularly, an off-axis aberration such as the astigmatism and the coma is corrected favorably.

Moreover, at the time of zooming from the wide angle end to the telephoto end, both the first negative lens unit (second lens unit G2) and the second positive lens unit (third lens unit G3) move to come closer to the stop. A position of the first negative lens unit (second lens unit G2) at the telephoto end is on the image side of a position of the first negative lens unit at the wide angle end, and a position of the second positive lens unit (second lens unit G3) at the telephoto end is on the object side of a position of the first negative lens unit at the wide angle end. As a result, even when the angle of view of the optical system is widened, it is possible to make the diameter of the first positive lens unit (first lens unit G1) small, and also it becomes easier to secure a high zoom ratio.

Moreover, the first positive lens unit (first lens unit G1) is stationary not only at the time of zooming but also at the time of focusing. By making such an arrangement, it is possible to simplify the layout of the optical system (lens units) in the zoom lens. As a result, it is possible to realize an image pickup apparatus of further smaller size.

Moreover, the first positive lens unit (first lens unit G1) includes a reflecting member having a reflecting surface which bends an optical path, a first positive lens unit object-side system, and a first positive lens unit image-side system. The first positive lens unit object-side system is positioned on the object side of the reflecting surface, and has a negative refractive power. The first positive lens unit image-side system is positioned on the image side of the reflecting surface, and has a positive refractive power. By making such an arrangement of the first positive lens unit, it is possible to secure an appropriate positive refractive power in the first positive lens unit (first lens unit G1). Moreover, it is possible to make a space for disposing the reflecting member small.

Figure 1B:
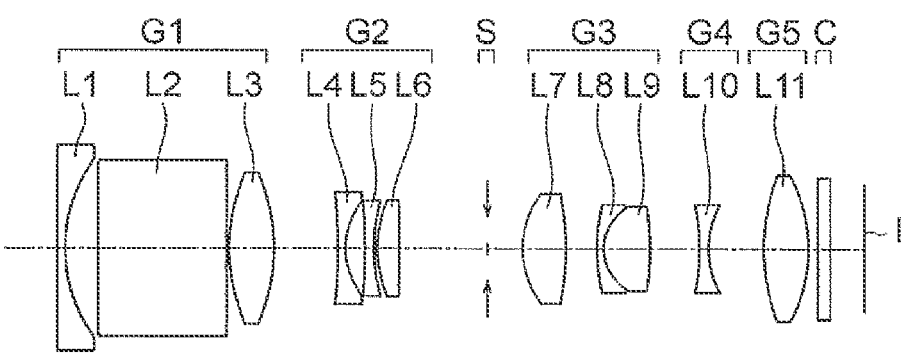
Figure 1C:
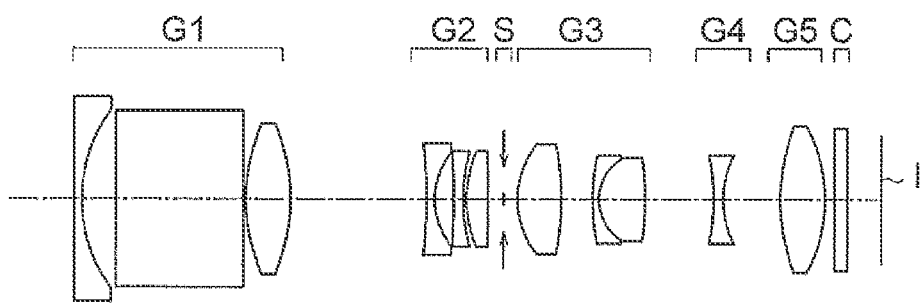

The zoom lens of the example 1, as shown in FIG. 1A, FIG. 1B, and FIG. 1C, includes in order from an object side, a first lens unit G1 (first positive lens unit) having a positive refractive power, a second lens unit G2 (first negative lens unit) having a negative refractive power, a third lens unit G3 (second positive lens unit) having a positive refractive power, a fourth lens unit G4 (second negative lens unit) having a negative refractive power, and a fifth lens unit G5 (third positive lens unit) having a positive refractive power. An aperture stop (stop) S is disposed between the second lens unit G2 (first negative lens unit) and the third lens unit G3 (second positive lens unit).

The first lens unit G1 includes a negative meniscus lens L1 having a convex surface directed toward the object side, a prism L2, and a biconvex positive lens L3. The second lens unit G2 includes a biconcave negative lens L4, a biconcave negative lens L5, and a positive meniscus lens L6 having a convex surface directed toward the object side. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. The fourth lens unit G4 includes a biconcave negative lens L10. The fifth lens unit G5 includes a biconvex positive lens L11.

At the time of zooming from a wide angle end to a telephoto end, the first lens unit G1 is fixed (stationary), the second lens unit G2 moves toward an image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 13 surfaces namely, both surfaces of the biconvex positive lens L3, both surfaces of the biconcave negative lens L4, both surfaces of the positive meniscus lens L6, both surfaces of the biconvex positive lens L7, an image-side surface of the biconvex positive lens L9, both surfaces of the biconcave negative lens L10, and both surfaces of the biconvex positive lens L11.

At the time of focusing from an object at infinity to an object at a close distance, the fourth lens unit G4 moves toward the image side along an optical axis.

Figure 2A:
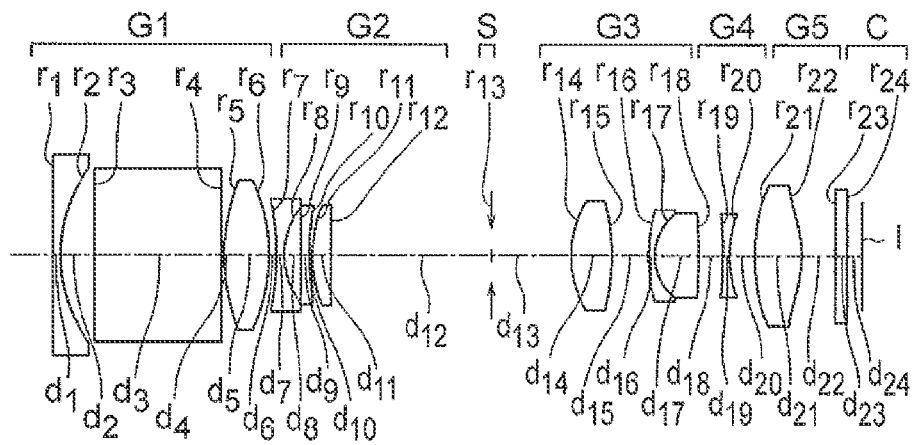
FIG. 2A, FIG. 2B, and FIG. 2C are lens cross-sectional views at the time of infinite object point focusing of a zoom lens according to an example 2, where.
Figure 2B:
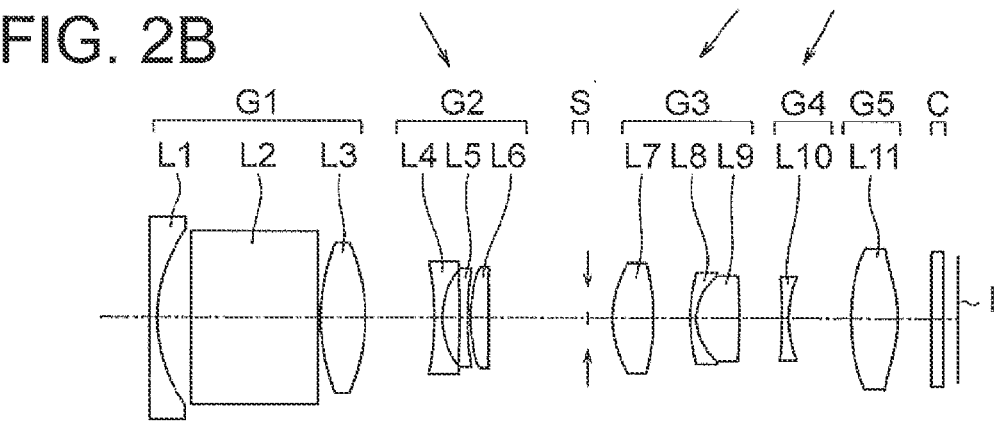
Figure 2C:
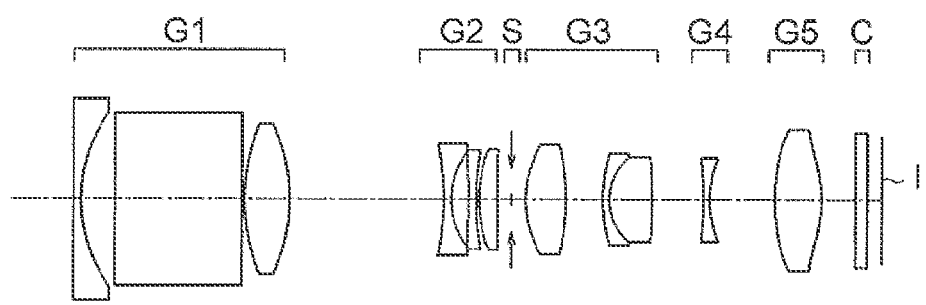

The zoom lens of the example 2, as shown in FIG. 2A, FIG. 2B, and FIG. 2C, includes in order from an object side, a first lens unit G1 (first positive lens unit) having a positive refractive power, a second lens unit G2 (first negative lens unit) having a negative refractive power, a third lens unit G3 (second positive lens unit) having a positive refractive power, a fourth lens unit G4 (second negative lens unit) having a negative refractive power, and a fifth lens unit G5 (third positive lens unit) having a positive refractive power. An aperture stop (stop) S is disposed between the second lens unit G2 (first negative lens unit) and the third lens unit G3 (second positive lens unit).

The first lens unit G1 includes a negative meniscus lens L1 having a convex surface directed toward the object side, a prism L2, and a biconvex positive lens L3. The second lens unit G2 includes a biconcave negative lens L4, a biconcave negative lens L5, and a positive meniscus lens L6 having a convex surface directed toward the object side. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. The fourth lens unit G4 includes a biconcave negative lens L10. The fifth lens unit G5 includes a biconvex positive lens L11.

At the time of zooming from a wide angle end to a telephoto end, the first lens unit G1 is fixed (stationary), the second lens unit G2 moves toward an image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 11 surfaces namely, both surfaces of the biconvex positive lens L3, both surfaces of the biconcave negative lens L4, both surfaces of the positive meniscus lens L6, both surfaces of the biconvex positive lens L7, an image-side surface of the biconvex positive lens L9, and both surfaces of the biconvex positive lens L11.

At the time of focusing from an object at infinity to an object at a close distance, the fourth lens unit G4 moves toward the image side along an optical axis.

Figure 3A:
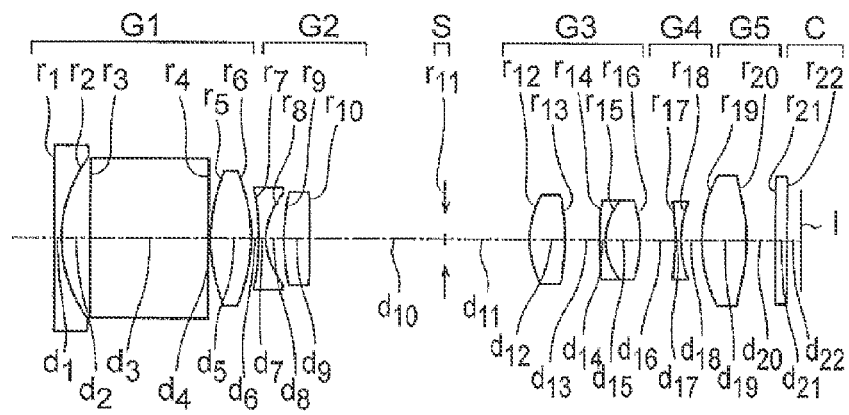
FIG. 3A, FIG. 3B, and FIG. 3C are lens cross-sectional views at the time of infinite object point focusing of a zoom lens according to an example 3, where.
Figure 3B:
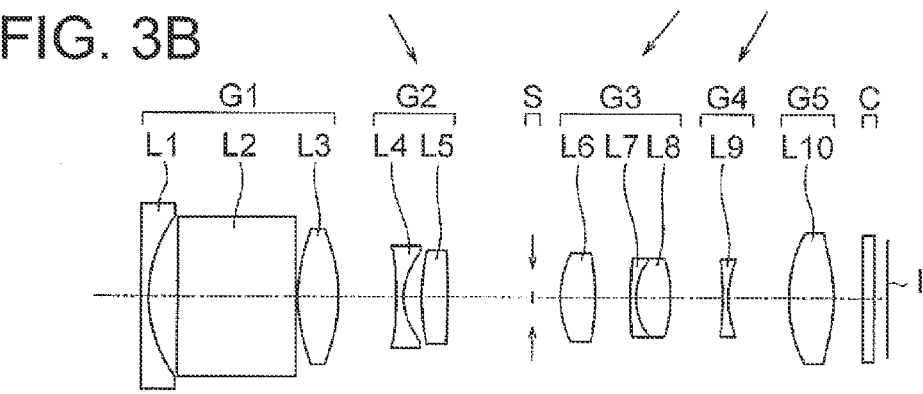
Figure 3C:
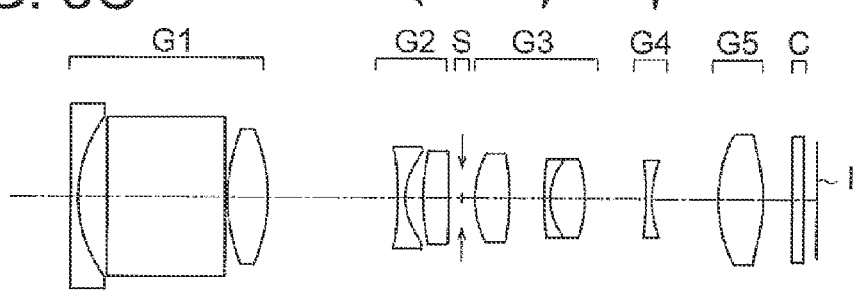

The zoom lens of the example 3, as shown in FIG. 3A, FIG. 3B, and FIG. 3C, includes in order from an object side, a first lens unit G1 (first positive lens unit) having a positive refractive power, a second lens unit G2 (first negative lens unit) having a negative refractive power, a third lens unit G3 (second positive lens unit) having a positive refractive power, a fourth lens unit G4 (second negative lens unit) having a negative refractive power, and a fifth lens unit G5 (third positive lens unit) having a positive refractive power. An aperture stop (stop) S is disposed between the second lens unit G2 (first negative lens unit) and the third lens unit G3 (second positive lens unit).

The first lens unit G1 includes a plano-concave negative lens L1, a prism L2, and a biconvex positive lens L3. The second lens unit G2 includes a biconcave negative lens L4 and a positive meniscus lens L5 having a convex surface directed toward the object side. The third lens unit G3 includes a biconvex positive lens L6, a negative meniscus lens L7 having a convex surface directed toward the object side, and a biconvex positive lens L8. Here, the negative meniscus lens L7 and the biconvex positive lens L8 are cemented. The fourth lens unit G4 includes a biconcave negative lens L9. The fifth lens unit G5 includes a biconvex positive lens L10.

At the time of zooming from a wide angle end to a telephoto end, the first lens unit G1 is fixed (stationary), the second lens unit G2 moves toward an image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 10 surfaces namely, both surfaces of the biconvex positive lens L3, both surfaces of the biconcave negative lens L4, both surfaces of the positive meniscus lens L5, both surfaces of the biconvex positive lens L6, and both surfaces of the biconvex positive lens L10.

At the time of focusing from an object an infinity to an object at a close distance, the fourth lens unit G4 moves toward the image side along an optical axis.

Figure 4A:
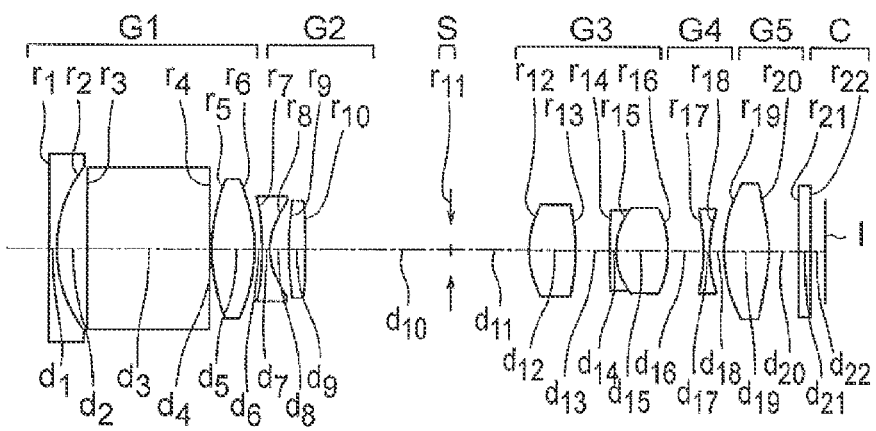
FIG. 4A, FIG. 4B, and FIG. 4C are lens cross-sectional views at the time of infinite object point focusing of a zoom lens according to an example 4, where.
Figure 4B:
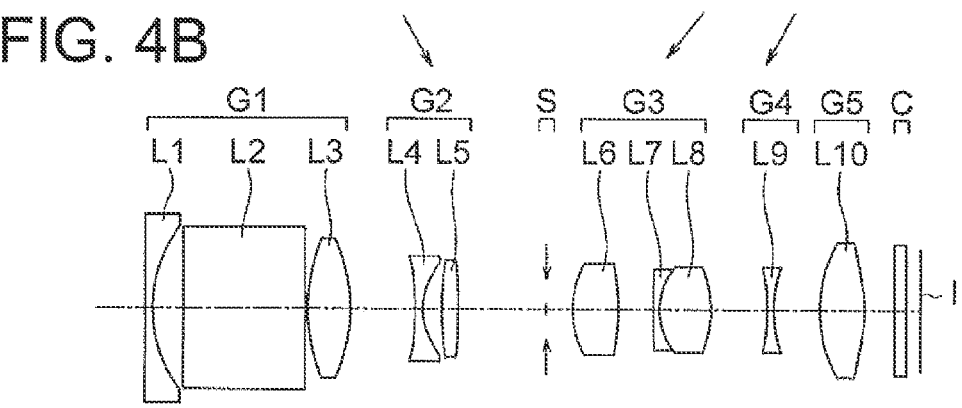
Figure 4C:
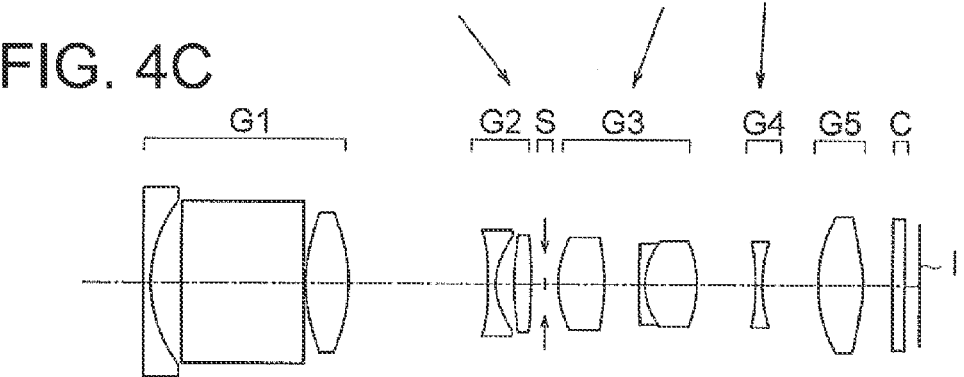

The zoom lens of the example 4, as shown in FIG. 4A, FIG. 4B, and FIG. 4C, includes in order from an object side, a first lens unit G1 (first positive lens unit) having a positive refractive power, a second lens unit G2 (first negative lens unit) having a negative refractive power, a third lens unit G3 (second positive lens unit) having a positive refractive power, a fourth lens unit G4 (second negative lens unit) having a negative refractive power, and a fifth lens unit G5 (third positive lens unit) having a positive refractive power. An aperture stop (stop) S is disposed between the second lens unit G2 (first negative lens unit) and the third lens unit G3 (second positive lens unit).

The first lens unit G1 includes a plano-concave lens L1, a prism L2, and a biconvex positive lens L3. The second lens unit G2 includes a biconcave negative lens L4 and a positive meniscus lens L5 having a convex surface directed toward the object side. The third lens unit G3 includes a biconvex positive lens L6, a negative meniscus lens L7 having a convex surface directed toward the object side, and a biconvex positive lens L8. Here, the negative meniscus lens L7 and the biconvex positive lens L8 are cemented. The fourth lens unit G4 includes a biconcave negative lens L9. The fifth lens unit G5 includes a biconvex positive lens L10.

At the time of zooming from a wide angle end to a telephoto end, the first lens unit G1 is fixed (stationary), the second lens unit G2 moves toward an image side, the aperture stop S is fixed (stationary), the third lens unit G3 moves toward the object side, the fourth lens unit G4 moves toward the object side, and the fifth lens unit G5 is fixed (stationary).

An aspheric surface is provided to a total of 10 surfaces namely, both surfaces of the biconvex positive lens L3, both surfaces of the biconcave negative lens L4, both surfaces of the positive meniscus lens L5, both surfaces of the biconvex positive lens L6, and both surfaces of the biconvex positive lens L10.

At the time of focusing from an object at infinity to an object at a close distance, the fourth lens unit G4 moves toward the image side along an optical axis.

Figure 5A:
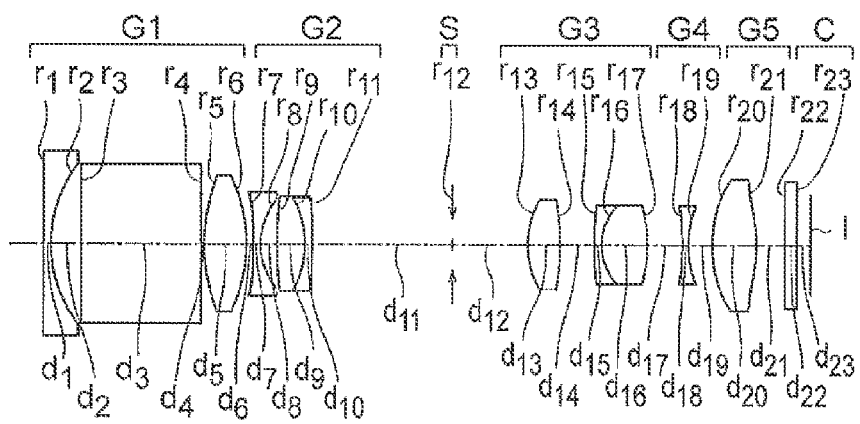
FIG. 5A, FIG. 5B, and FIG. 5C are lens cross-sectional views at the time of infinite object point focusing of a zoom lens according to an example 5, where.
Figure 5B:
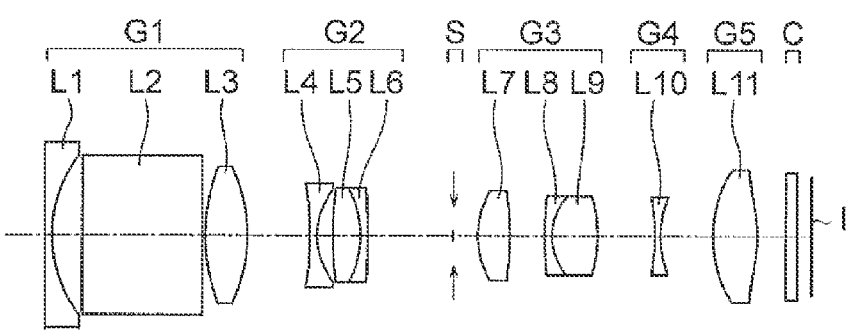
Figure 5C:
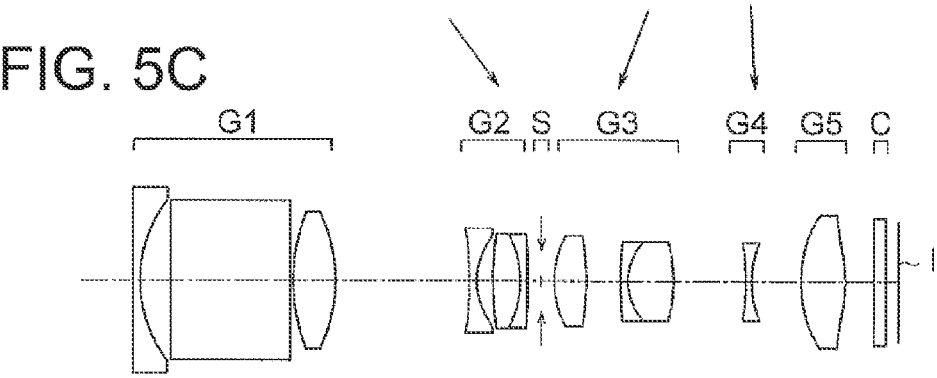

The zoom lens of the example 5, as shown in FIG. 5A, FIG. 5B, and FIG. 5C, includes in order from an object side, a first lens unit G1 (first positive lens unit) having a positive refractive power, a second lens unit G2 (a first negative lens unit) having a negative refractive power, a third lens unit G3 (second positive lens unit) having a positive refractive power, a fourth lens unit G4 (second negative lens unit) having a negative refractive power, and a fifth lens unit G5 (third positive lens unit) having a positive refractive power. An aperture stop (stop) S is disposed between the second lens unit G2 (first negative lens unit) and the third lens unit G3 (second positive lens unit).

The first lens unit G1 includes a biconcave negative lens L1, a prism L2, and a biconvex positive lens L3. The second lens unit G2 includes a biconcave negative lens L4, a biconvex positive lens L5, and a negative meniscus lens L6 having a convex surface directed toward an image side. Here, the biconvex positive lens L5 and the negative meniscus lens L6 are cemented. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. The fourth lens unit G4 includes a biconcave negative lens L10. The fifth lens unit G5 includes a biconvex positive lens L11.

At the time of zooming from a wide angle end to a telephoto end, the first lens unit G1 is fixed (stationary), the second lens unit G2 moves toward the image side, the aperture stop S is fixed (stationary), the third lens unit G3 moves toward the object side, the fourth lens unit G4, after moving toward the object side, moves toward the image side, and the fifth lens unit G5 is fixed (stationary). An amount by which the fourth lens unit G4 moves toward the image side is small.

An aspheric surface is provided to a total of nine surfaces namely, both surfaces of the biconvex positive lens L3, both surfaces of the biconcave negative lens L4, an image-side surface of the negative meniscus lens L6, both surfaces of the biconvex positive lens L7, and both surfaces of the biconvex positive lens L11.

At the time of focusing from an object at infinity to an object at a close distance, the fourth lens unit G4 moves toward the image side along an optical axis.

Figure 6A:
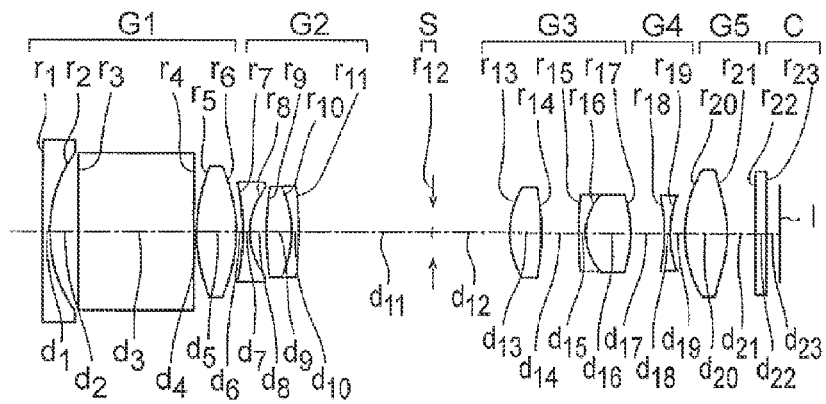
FIG. 6A, FIG. 6B, and FIG. 6C are lens cross-sectional views at the time of infinite object point focusing of a zoom lens according to an example 6, where.
Figure 6B:
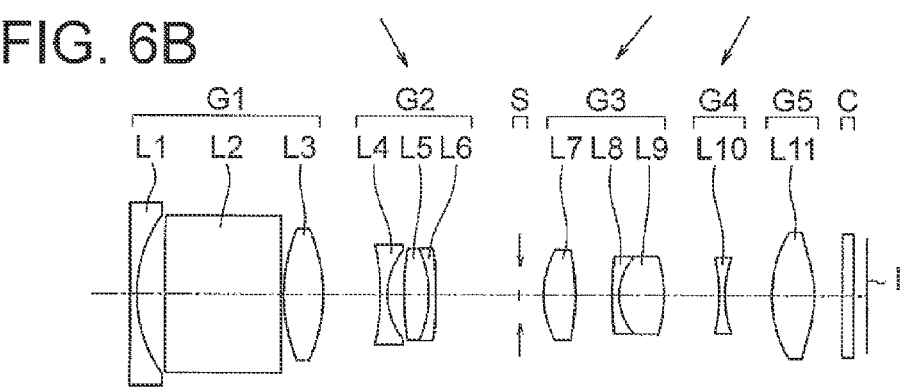
Figure 6C:
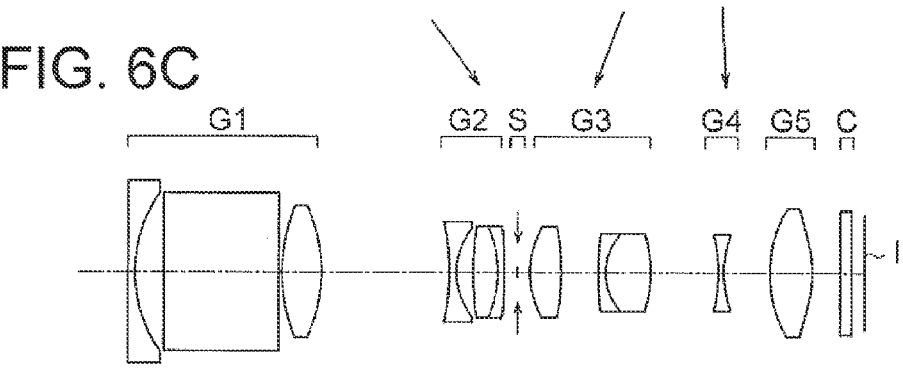
Figure 8A:
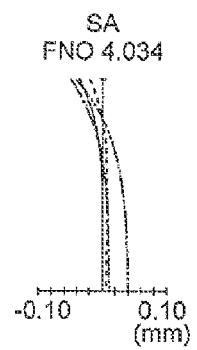
FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams at the time of infinite object point focusing of the zoom lens of the example 2.
Figure 8B:
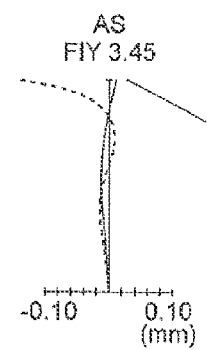
Figure 8C:
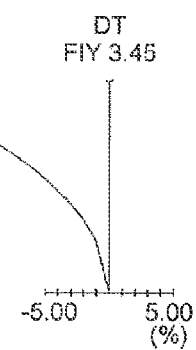
Figure 8D:
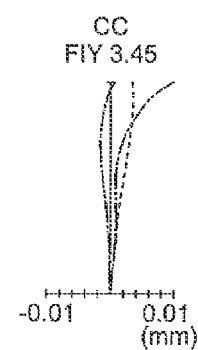
Figure 8E:
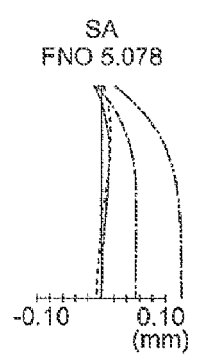
Figure 8F:
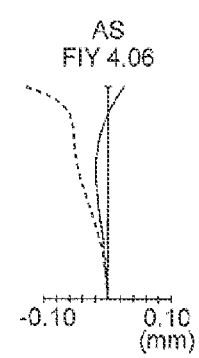
Figure 8G:
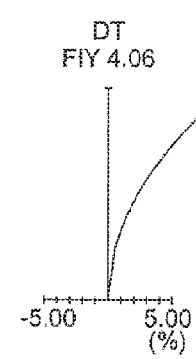
Figure 8H:
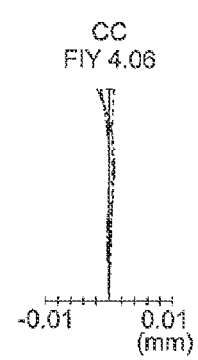
Figure 8I:
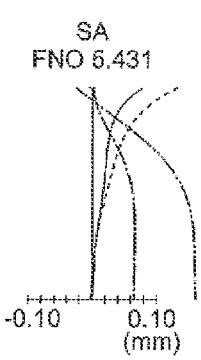
Figure 8J:
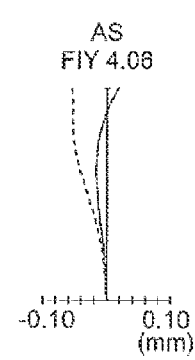
Figure 8K:
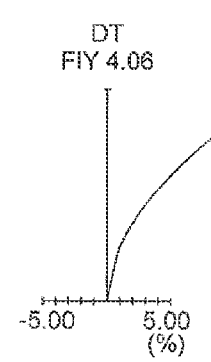
Figure 8L:
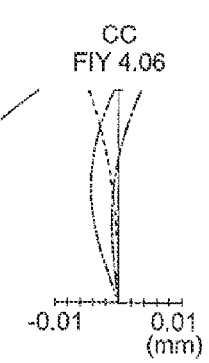
Figure 9A:
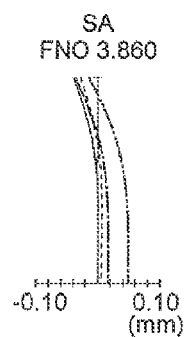
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams at the time of infinite object point focusing of the zoom lens of the example 3.
Figure 9B:
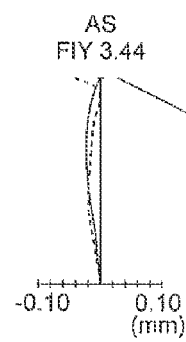
Figure 9C:
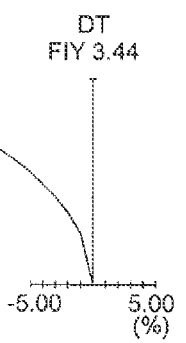
Figure 9D:
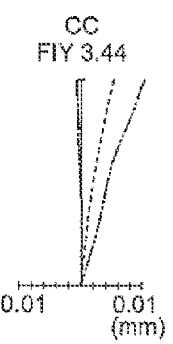
Figure 9E:
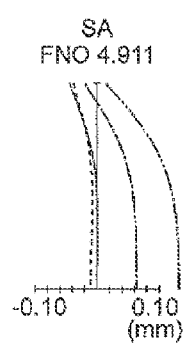
Figure 9F:
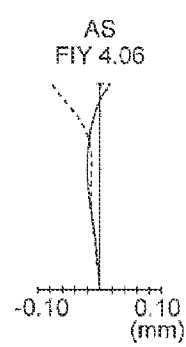
Figure 9G:
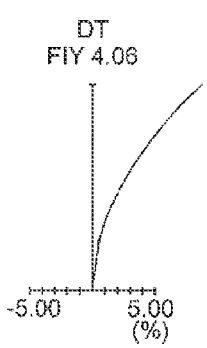
Figure 9H:
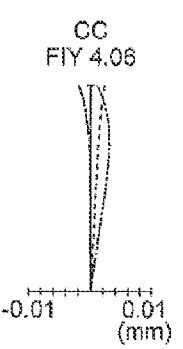
Figure 9I:
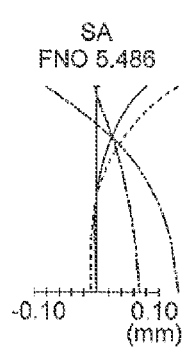
Figure 9J:
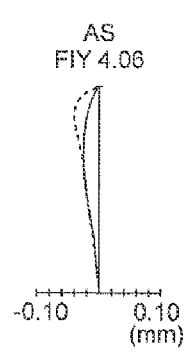
Figure 9K:
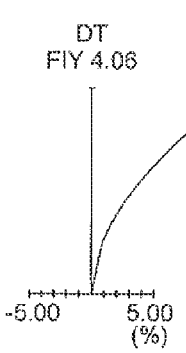
Figure 9L:
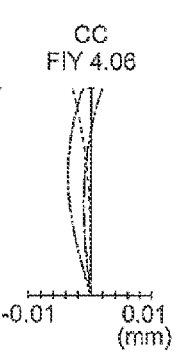

The zoom lens of the example 6, as shown in FIG. 6A, FIG. 6B, and FIG. 6C, includes in order from an object side, a first lens unit G1 (first positive lens unit) having a positive refractive power, a second lens unit G2 (first negative lens unit) having a negative refractive power, a third lens unit G3 (second positive lens unit) having a positive refractive power, a fourth lens unit G4 (second negative lens unit) having a negative refractive power, and a fifth lens unit G5 (third positive lens unit) having a positive refractive power. An aperture stop (stop) S is disposed between the second lens unit G2 (first negative lens unit) and the third lens unit G3 (second positive lens unit).

The first lens unit G1 includes a plano-concave negative lens L1, a prism L2, and a biconvex positive lens L3. The second lens unit G2 includes a biconcave negative lens L4, a biconvex positive lens L5, and a negative meniscus lens L6 having a convex surface directed toward an image side. Here, the biconvex positive lens L5 and the negative meniscus lens L6 are cemented. The third lens unit G3 includes a biconvex positive lens L7, a negative meniscus lens L8 having a convex surface directed toward the object side, and a biconvex positive lens L9. Here, the negative meniscus lens L8 and the biconvex positive lens L9 are cemented. The fourth lens unit G4 includes a biconcave negative lens L10. The fifth lens unit G5 includes a biconvex positive lens L11.

At the time of zooming from a wide angle end to a telephoto end, the first lens unit G1 is fixed (stationary), the second lens unit G2 moves toward the image side, the aperture stop S is fixed (stationary), the third lens unit G3 moves toward the object side, the fourth lens unit G4, after moving toward the object side, moves toward the image side, and the fifth lens unit G5 is fixed (stationary). An amount by which the fourth lens unit G4 moves toward the image side is small.

An aspheric surface is provided to a total of nine surfaces namely, both surfaces of the biconvex positive lens L3, both surfaces of the biconcave negative lens L4, an image-side surface of the negative meniscus lens L6, both surfaces of the biconvex positive lens L7, and both surfaces of the biconvex positive lens L11.

At the time of focusing from an object at infinity to an object at a close distance, the fourth lens unit G4 moves toward the image side along an optical axis.

Numerical data of each example described above is shown below. Apart from symbols described above, r denotes radius of curvature of each lens surface, d denotes a distance between respective lens surfaces, nd denotes a refractive index of each lens for a d-line, vd denotes an Abbe number for each lens and * denotes an aspheric surface. Further, f denotes a focal length of the entire system, FNO. denotes an F number, ω denotes a half angle of view, IH denotes an image height, FB denotes a back focus, Lens total length is a distance from a lens forefront surface up to a lens backmost surface and each of f1, f2 . . . is a focal length of each lens unit. Further, FB (back focus) is a unit which is expressed upon air conversion of a distance from the lens backmost surface to a paraxial image surface. Further, wide denotes a wide angle end, standard denotes a intermediate focal length state, tele denotes a telephoto end.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, $$Z=(y^2/r)/[1+\{1-(1+k)(y/r)^2\}^{1/2}]+A4y^4+A6y^6+A8y^8+A10y^{10}$$

Further, in the aspherical surface coefficients, 'e-n' (where, n is an integral number) indicates '$10^{-n}$'. Moreover, these symbols are commonly used in the following numerical data for each example.

EXAMPLE 1

| Unit mm | | | | |
|---|---|---|---|---|
| Surface data | | | | |
| Surface no. | r | d | nd | vd |
| Object plane | ∞ | ∞ | | |
| 1 | 5868.194 | 0.50 | 2.00100 | 29.13 |
| 2 | 9.944 | 2.15 | | |
| 3 | ∞ | 8.10 | 1.92286 | 20.88 |
| 4 | ∞ | 0.15 | | |
| 5* | 11.221 | 2.85 | 1.61881 | 63.85 |
| 6* | -11.727 | Variable | | |
| 7* | -29.210 | 0.50 | 1.77030 | 47.40 |
| 8* | 4.583 | 1.25 | | |
| 9 | -40.857 | 0.60 | 1.69680 | 55.53 |
| 10 | 11.727 | 0.20 | | |
| 11* | 7.066 | 1.38 | 1.80486 | 24.74 |
| 12* | 224.805 | Variable | | |
| 13 (stop) | ∞ | Variable | | |
| 14* | 5.477 | 2.81 | 1.61881 | 63.85 |
| 15* | -13.884 | 1.98 | | |
| 16 | 13.769 | 0.40 | 2.00100 | 29.13 |
| 17 | 3.058 | 2.95 | 1.50670 | 70.48 |
| 18* | -27.236 | Variable | | |
| 19* | -19.053 | 0.60 | 1.53071 | 55.69 |
| 20* | 5.481 | Variable | | |
| 21* | 12.240 | 2.90 | 1.53071 | 55.69 |
| 22* | -9.810 | 0.60 | | |
| 23 | ∞ | 0.80 | 1.51633 | 64.14 |
| 24 | ∞ | 2.17 | | |
| Image plane (Image pickup surface) | ∞ | | | |

| Aspherical surface data |
|---|

5th surface k = 0.000
A4 = -1.33845e-04, A6 = -4.38033e-06, A8 = 1.74779e-07,
A10 = -3.45325e-09

6th surface k = 0.000
A4 = 1.78647e-04, A6 = -3.90166e-06, A8 = 1.64975e-07,
A10 = -3.15774e-09

7th surface k = 0.000
A4 = 9.30133e-04, A6 = -7.55140e-05, A8 = -8.82412e-07,
A10 = 9.03479e-08

8th surface k = 0.000
A4 = -9.10768e-04, A6 = 5.68096e-05, A8 = -6.37103e-06,
A10 = -5.42047e-07

11th surface k = 0.000
A4 = -2.15456e-03, A6 = 7.25939e-05, A8 = 9.43097e-06,
A10 = -3.99105e-07

12th surface k = 0.000
A4 = -1.12076e-03, A6 = 7.36307e-06, A8 = 7.46212e-06

14th surface k = 0.000
A4 = -5.52046e-04, A6 = -1.13281e-05

15th surface k = 0.000
A4 = 8.27756e-04, A6 = -1.59393e-05, A8 = 7.53204e-07

18th surface k = 0.000
A4 = -1.13944e-03, A6 = 5.39936e-05, A8 = -1.12183e-05

19th surface k = 0.000
A4 = -2.80342e-03, A6 = 2.05341e-04

20th surface k = 0.000
A4 = -2.22654e-03, A6 = 1.32701e-04

-continued

Unit mm

21th surface k = 0.000
A4 = −6.73442e−05
22th surface k = 0.000
A4 = −1.11186e−05

Zoom data

|  | wide | standard | tele |
|---|---|---|---|
| f | 3.91 | 8.54 | 18.80 |
| Fno. | 4.01 | 5.09 | 5.85 |
| 2ω | 89.57 | 47.44 | 22.08 |
| IH | 3.25 | 3.86 | 3.86 |
| FB (in air) | 3.30 | 3.30 | 3.30 |
| Lens total length (in air) | 51.26 | 51.26 | 51.26 |
| d6 | 0.50 | 4.11 | 8.76 |
| d12 | 9.26 | 5.65 | 1.00 |
| d13 | 5.76 | 2.26 | 0.90 |
| d18 | 1.68 | 3.14 | 4.36 |
| d20 | 1.44 | 3.48 | 3.62 |

Unit focal length

| f1 = 12.67 | f2 = −6.98 | f3 = 8.75 | f4 = −7.95 | f5 = 10.75 |

EXAMPLE 2

Unit mm

Surface data

| Surface no. | r | d | nd | νd |
|---|---|---|---|---|
| Object plane | ∞ | ∞ | | |
| 1 | 6181.608 | 0.50 | 2.00100 | 29.13 |
| 2 | 9.966 | 2.15 | | |
| 3 | ∞ | 8.10 | 1.92286 | 20.88 |
| 4 | ∞ | 0.15 | | |
| 5* | 12.086 | 2.84 | 1.61881 | 63.85 |
| 6* | −11.596 | Variable | | |
| 7* | −15.573 | 0.49 | 1.74320 | 49.29 |
| 8* | 5.199 | 1.10 | | |
| 9 | −75.708 | 0.50 | 1.69680 | 55.53 |
| 10 | 19.492 | 0.20 | | |
| 11* | 9.192 | 1.19 | 1.82115 | 24.06 |
| 12* | 296.829 | Variable | | |
| 13(stop) | ∞ | Variable | | |
| 14* | 6.476 | 2.60 | 1.61881 | 63.85 |
| 15* | −13.494 | 2.36 | | |
| 16 | 10.901 | 0.40 | 2.00100 | 29.13 |
| 17 | 3.587 | 2.77 | 1.49710 | 81.56 |
| 18* | −44.262 | Variable | | |
| 19 | −27.230 | 0.40 | 1.78590 | 44.20 |
| 20 | 7.207 | Variable | | |
| 21* | 16.474 | 2.98 | 1.53071 | 55.69 |
| 22* | −7.572 | 2.18 | | |
| 23 | ∞ | 0.80 | 1.51633 | 64.14 |
| 24 | ∞ | 0.94 | | |
| Image plane (Image pickup surface) | ∞ | | | |

Aspherical surface data

5th surface k = 0.000
A4 = −1.89595e−04, A6 = 1.80336e−06, A8 = −6.11145e−08,
A10 = 5.37248e−10

-continued

Unit mm

6th surface k = 0.000
A4 = 8.72575e−05, A6 = 2.26896e−06, A8 = −7.32667e−08,
A10 = 8.18844e−10
7th surface k = 0.000
A4 = 1.12197e−03, A6 = −5.10784e−05, A8 = −2.79168e−06,
A10 = 1.16978e−07
8th surface k = 0.000
A4 = −2.58679e−04, A6 = 8.28937e−05, A8 = 7.25167e−06,
A10 = −1.50418e−06
11th surface k = 0.000
A4 = −1.50684e−03, A6 = 3.27739e−05, A8 = 2.14545e−05,
A10 = −7.98449e−07
12th surface k = 0.000
A4 = −1.00574e−03, A6 = −2.22312e−05, A8 = 1.39239e−05
14th surface k = 0.000
A4 = −5.89917e−04, A6 = −7.24150e−06
15th surface k = 0.000
A4 = 3.19972e−04, A6 = −7.84875e−06, A8 = 2.86898e−07
18th surface k = 0.000
A4 = −1.33060e−04, A6 = 7.97010e−06, A8 = −5.84876e−06
21th surface k = 0.000
A4 = 5.82829e−04
22th surface k = 0.000
A4 = 1.65960e−03

Zoom data

|  | wide | standard | tele |
|---|---|---|---|
| f | 3.91 | 8.54 | 18.80 |
| Fno. | 4.03 | 5.08 | 5.43 |
| 2ω | 89.35 | 45.25 | 20.82 |
| IH | 3.25 | 3.86 | 3.86 |
| FB (in air) | 3.65 | 3.65 | 3.65 |
| Lens total length(in air) | 51.49 | 51.49 | 51.49 |
| d6 | 0.50 | 4.44 | 9.93 |
| d12 | 10.33 | 6.39 | 0.90 |
| d13 | 5.13 | 1.62 | 0.90 |
| d18 | 1.51 | 2.70 | 3.26 |
| d20 | 1.64 | 3.96 | 4.12 |

Unit focal length

| f1 = 13.51 | f2 = −7.44 | f3 = 8.55 | f4 = −7.21 | f5 = 10.21 |

EXAMPLE 3

Unit mm

Surface data

| Surface no. | r | d | nd | vd |
|---|---|---|---|---|
| Object plane | ∞ | ∞ | | |
| 1 | ∞ | 0.50 | 2.00100 | 29.13 |
| 2 | 9.680 | 1.97 | | |
| 3 | ∞ | 8.10 | 1.92286 | 20.88 |
| 4 | ∞ | 0.15 | | |
| 5* | 11.430 | 2.83 | 1.61881 | 63.85 |
| 6* | −11.133 | Variable | | |
| 7* | −24.279 | 0.50 | 1.85370 | 40.58 |
| 8* | 4.179 | 1.26 | | |
| 9* | 14.302 | 1.78 | 2.10300 | 18.05 |
| 10* | 4710.816 | Variable | | |
| 11(stop) | ∞ | Variable | | |
| 12* | 6.409 | 2.44 | 1.61881 | 63.85 |
| 13* | −13.508 | 2.39 | | |
| 14 | 29.992 | 0.40 | 2.00100 | 29.13 |
| 15 | 4.349 | 2.39 | 1.48749 | 70.23 |
| 16 | −8.597 | Variable | | |
| 17 | −20.612 | 0.40 | 1.78590 | 44.20 |
| 18 | 7.299 | Variable | | |
| 19* | 11.030 | 3.09 | 1.53071 | 55.69 |
| 20* | −9.161 | 2.00 | | |
| 21 | ∞ | 0.80 | 1.51633 | 64.14 |
| 22 | ∞ | 0.94 | | |
| Image plane (Image pickup surface) | ∞ | | | |

Aspherical surface data

5th surface k = 0.000
A4 = −1.79432e−04, A6 = −4.29538e−07, A8 = 1.90394e−08,
A10 = −4.62468e−10

6th surface k = 0.000
A4 = 1.467586e−04, A6 = 1.73874e−07

7th surface k = 0.000
A4 = −1.45072e−04, A6 = −4.84437e−05, A8 = −2.95716e−08,
A10 = 4.62249e−08

8th surface k = 0.000
A4 = −1.78443e−03, A6 = 2.94906e−05, A8 = −1.40099e−05,
A10 = 2.03050e−09

9th surface k = 0.000
A4 = −9.30675e−04, A6 = 7.17812e−05, A8 = 8.73913e−07,
A10 = −2.09447e−07

10th surface k = 0.000
A4 = −1.09602e−03, A6 = 3.04657e−05, A8 = −1.22498e−07

12th surface k = 0.000
A4 = −4.30124e−04, A6 = 2.72025e−06

13th surface k = 0.000
A4 = 6.52400e−04, A6 = −3.16143e−06, A8 = 3.85219e−07

19th surface k = 0.000
A4 = 1.58687e−04, A6 = 7.76641e−06, A8 = −1.05484e−07

20th surface k = 0.000
A4 = 1.20347e−03, A6 = −4.02664e−06, A8 = 1.03124e−07

Zoom data

| | wide | standard | tele |
|---|---|---|---|
| f | 3.82 | 8.37 | 18.35 |
| Fno. | 3.86 | 4.91 | 5.49 |
| 2ω | 90.43 | 46.27 | 21.49 |
| IH | 3.24 | 3.86 | 3.86 |
| FB (in air) | 3.47 | 3.47 | 3.47 |
| Lens total length(in air) | 51.25 | 51.25 | 51.25 |
| d6 | 0.50 | 4.00 | 8.99 |
| d10 | 9.39 | 5.89 | 0.90 |
| d11 | 5.84 | 1.93 | 0.90 |
| d16 | 2.40 | 3.59 | 4.20 |
| d18 | 1.45 | 4.17 | 4.59 |

Unit focal length f1 = 12.58   f2 = −7.12   f3 = 8.76   f4 = −6.82   f5 = 9.96

EXAMPLE 4

Unit mm

Surface data

| Surface no. | r | d | nd | vd |
|---|---|---|---|---|
| Object plane | ∞ | ∞ | | |
| 1 | ∞ | 0.50 | 2.00100 | 29.13 |
| 2 | 9.311 | 2.03 | | |
| 3 | ∞ | 8.10 | 1.92286 | 20.88 |
| 4 | ∞ | 0.15 | | |
| 5* | 11.656 | 2.85 | 1.61881 | 63.85 |
| 6* | −10.536 | Variable | | |
| 7* | −31.340 | 0.50 | 1.85075 | 40.16 |
| 8* | 4.033 | 1.25 | | |
| 9* | 15.621 | 1.14 | 2.10300 | 18.05 |
| 10* | −299.752 | Variable | | |
| 11(stop) | ∞ | Variable | | |
| 12* | 6.392 | 3.09 | 1.61881 | 63.85 |
| 13* | −12.550 | 2.31 | | |
| 14 | 64.852 | 0.40 | 2.00100 | 29.13 |
| 15 | 4.550 | 3.43 | 1.48749 | 70.23 |
| 16 | −7.461 | Variable | | |
| 17 | −12.468 | 0.40 | 1.78590 | 44.20 |
| 18 | 8.860 | Variable | | |
| 19* | 10.575 | 3.00 | 1.53071 | 55.69 |
| 20* | −8.065 | 1.98 | | |
| 21 | ∞ | 0.80 | 1.51633 | 64.14 |
| 22 | ∞ | 0.92 | | |
| Image plane (Image pickup surface) | ∞ | | | |

Aspherical surface data

5th surface k = 0.000
A4 = −1.50197e−04, A6 = −8.51991e−07, A8 = 1.09609e−08,
A10 = −3.86917e−10

6th surface k = 0.000
A4 = 1.98782e−04, A6 = −4.19557e−07

-continued

Unit mm

7th surface k = 0.000
A4 = −1.83870e−03, A6 = 9.71472e−05, A8 = −7.12997e−06,
A10 = 2.11448e−07
8th surface k = 0.000
A4 = −3.21370e−03, A6 = 3.11120e−05, A8 = −1.24058e−05,
A10 = −1.65452e−08
9th surface k = 0.000
A4 = −7.98548e−04, A6 = 6.00564e−06, A8 = 3.50746e−07,
A10 = −7.70670e−08
10th surface k = 0.000
A4 = −1.26595e−03, A6 = 9.71283e−08, A8 = −9.28803e−09
12th surface k = 0.000
A4 = −3.65084e−04, A6 = 4.50026e−06
13th surface k = 0.000
A4 = 8.45812e−04, A6 = −2.79446e−06, A8 = 5.95940e−07
19th surface k = 0.000
A4 = 8.47209e−04, A6 = −2.16855e−05, A8 = −1.20990e−07
20th surface k = 0.000
A4 = 2.82969e−03, A6 = −6.11240e−05, A8 = 1.16675e−07

Zoom data

|  | wide | standard | tele |
|---|---|---|---|
| f | 3.82 | 8.37 | 18.35 |
| Fno. | 3.95 | 5.09 | 5.57 |
| 2ω | 90.17 | 45.66 | 21.19 |
| IH | 3.24 | 3.86 | 3.86 |
| FB (in air) | 3.43 | 3.43 | 3.43 |
| Lens total length(in air) | 51.34 | 51.34 | 51.34 |
| d6 | 0.50 | 4.33 | 9.29 |
| d10 | 9.69 | 5.86 | 0.90 |
| d11 | 5.23 | 1.75 | 0.90 |
| d16 | 2.36 | 3.76 | 3.95 |
| d18 | 0.98 | 3.06 | 3.72 |

Unit focal length

| f1 = 12.05 | f2 = −7.03 | f3 = 9.21 | f4 = −6.54 | f5 = 9.13 |

EXAMPLE 5

Unit mm

Surface data

| Surface no. | r | d | nd | vd |
|---|---|---|---|---|
| Object plane | ∞ | ∞ | | |
| 1 | −99567.235 | 0.50 | 2.00100 | 29.13 |
| 2 | 9.312 | 2.04 | | |
| 3 | ∞ | 8.10 | 1.92286 | 20.88 |
| 4 | ∞ | 0.20 | | |
| 5* | 12.455 | 2.85 | 1.61881 | 63.85 |
| 6* | −10.274 | Variable | | |
| 7* | −71.265 | 0.50 | 1.85075 | 40.16 |
| 8* | 4.512 | 1.11 | | |
| 9 | 24.488 | 1.90 | 1.84666 | 23.78 |
| 10 | −6.924 | 0.50 | 1.80610 | 40.88 |
| 11* | −1027.764 | Variable | | |
| 12(stop) | ∞ | Variable | | |
| 13* | 6.161 | 2.20 | 1.61881 | 63.85 |
| 14* | −14.534 | 2.33 | | |
| 15 | 24.464 | 0.50 | 2.00100 | 29.13 |
| 16 | 4.100 | 3.10 | 1.51633 | 64.14 |
| 17 | −9.936 | Variable | | |
| 18 | −16.401 | 0.40 | 1.80610 | 40.92 |
| 19 | 7.156 | Variable | | |
| 20* | 10.527 | 3.00 | 1.53071 | 55.69 |
| 21* | −8.654 | 1.98 | | |
| 22 | ∞ | 0.80 | 1.51633 | 64.14 |
| 23 | ∞ | 0.91 | | |
| Image plane (Image pickup surface) | ∞ | | | |

Aspherical surface data

5th surface k = 0.000
A4 = −1.14157e−04, A6 = −1.06973e−06, A8 = 3.48137e−08,
A10 = −4.73170e−10
6th surface k = 0.000
A4 = 2.14980e−04, A6 = −5.81892e−07, A8 = 1.89136e−08
7th surface k = 0.000
A4 = −1.37355e−03, A6 = 3.80725e−05, A8 = −3.71709e−06,
A10 = 1.23109e−07
8th surface k = 0.000
A4 = −1.39480e−03, A6 = 1.07385e−05, A8 = −1.04870e−05,
A10 = 2.59529e−07
11th surface k = 0.000
A4 = −9.67484e−04, A6 = −8.06696e−06
13th surface k = 0.000
A4 = −4.08137e−04, A6 = 3.32884e−06
14th surface k = 0.000
A4 = 6.61170e−04, A6 = 4.54484e−06
20th surface k = 0.000
A4 = 7.76209e−04, A6 = −1.13820e−05, A8 = 8.78426e−08
21st surface k = 0.000
A4 = 2.36390e−03, A6 = −3.72524e−05, A8 = 2.91395e−07

Zoom data

|  | wide | standard | tele |
|---|---|---|---|
| f | 3.82 | 8.37 | 18.34 |
| Fno. | 3.95 | 5.30 | 5.81 |
| 2ω | 90.42 | 45.68 | 21.16 |
| IH | 3.24 | 3.86 | 3.86 |
| FB (in air) | 3.42 | 3.42 | 3.42 |
| Lens total length(in air) | 51.87 | 51.87 | 51.87 |
| d6 | 0.45 | 4.21 | 9.17 |
| d11 | 9.62 | 5.86 | 0.90 |
| d12 | 5.16 | 1.71 | 0.90 |

-continued

| Unit mm | | | |
|---|---|---|---|
| d17 | 2.36 | 3.86 | 4.89 |
| d19 | 1.63 | 3.58 | 3.36 |

| Unit focal length | | | | |
|---|---|---|---|---|
| f1 = 12.33 | f2 = −6.69 | f3 = 8.66 | f4 = −6.13 | f5 = 9.46 |

EXAMPLE 6

| Unit mm | | | | |
|---|---|---|---|---|
| Surface data | | | | |
| Surface no. | r | d | nd | vd |
| Object plane | ∞ | ∞ | | |
| 1 | ∞ | 0.50 | 2.00100 | 29.13 |
| 2 | 10.044 | 2.01 | | |
| 3 | ∞ | 8.10 | 1.92286 | 20.88 |
| 4 | ∞ | 0.20 | | |
| 5* | 12.083 | 2.79 | 1.61881 | 63.85 |
| 6* | −10.867 | Variable | | |
| 7* | −20.570 | 0.50 | 1.85075 | 40.16 |
| 8* | 4.688 | 1.20 | | |
| 9 | 23.358 | 1.77 | 1.84666 | 23.78 |
| 10 | −7.982 | 0.50 | 1.80610 | 40.88 |
| 11* | −49.610 | Variable | | |
| 12(stop) | ∞ | Variable | | |
| 13* | 6.353 | 2.25 | 1.61881 | 63.85 |
| 14* | −14.273 | 2.60 | | |
| 15 | 27.579 | 0.50 | 2.00100 | 29.13 |
| 16 | 4.100 | 3.17 | 1.51633 | 64.14 |
| 17 | −9.550 | Variable | | |
| 18 | −12.193 | 0.40 | 1.80610 | 40.92 |
| 19 | 7.703 | Variable | | |
| 20* | 10.352 | 3.00 | 1.53071 | 55.69 |
| 21* | −7.215 | 1.98 | | |
| 22 | ∞ | 0.80 | 1.51633 | 64.14 |
| 23 | ∞ | 0.93 | | |
| Image plane (Image pickup surface) | ∞ | | | |

Aspherical surface data

5th surface k = 0.000
A4 = −1.17729e−04, A6 = −7.82163e−07, A8 = 1.72488e−08,
A10 = −5.79768e−10
6th surface k = 0.000
A4 = 2.00799e−04, A6 = −4.57801e−07, A8 = 2.98894e−11
7th surface k = 0.000
A4 = −2.47459e−04, A6 = −8.37207e−06, A8 = −1.84912e−06,
A10 = 8.11537e−08
8th surface k = 0.000
A4 = −7.21815e−04, A6 = 2.51719e−05, A8 = −1.13482e−05,
A10 = 3.43610e−07
11th surface k = 0.000
A4 = −6.72712e−04, A6 = −2.17526e−05
13th surface k = 0.000
A4 = −4.25770e−04, A6 = −4.46440e−06

-continued

| Unit mm |
|---|

14th surface k = 0.000
A4 = 5.47621e−04, A6 = −3.96883e−06
20th surface k = 0.000
A4 = 5.43640e−04, A6 = −2.02382e−05, A8 = 5.45259e−07
21th surface k = 0.000
A4 = 2.36390e−03, A6 = −5.96731e−05, A8 = 1.32792e−06

| Zoom data | | | |
|---|---|---|---|
| | wide | standard | tele |
| f | 3.82 | 8.37 | 18.35 |
| Fno. | 3.64 | 5.33 | 5.83 |
| 2ω | 90.34 | 45.71 | 21.15 |
| IH | 3.24 | 3.86 | 3.86 |
| FB (in air) | 3.44 | 3.44 | 3.44 |
| Lens total length(in air) | 51.85 | 51.85 | 51.85 |
| d6 | 0.45 | 4.04 | 9.07 |
| d11 | 9.52 | 5.93 | 0.90 |
| d12 | 5.50 | 1.73 | 0.90 |
| d17 | 2.40 | 3.89 | 4.80 |
| d19 | 1.05 | 3.33 | 3.25 |

| Unit focal length | | | | |
|---|---|---|---|---|
| f1 = 12.62 | f2 = −6.82 | f3 = 8.93 | f4 = −5.80 | f5 = 8.52 |

Aberration diagrams of the examples from the example 1 to the example 6 are shown in diagrams from FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L (hereinafter, 'FIG. 7A to FIG. 7L') to FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L' respectively. Each of the aberration diagrams is an aberration diagram when focused to an object at infinity. Moreover, in each diagram 'FIY' indicates an image height when 0.2 mm is added to an image height IH, assuming that image motion due to camera shake is reduced by moving by shifting the image pickup element.

In the aberration diagrams, diagrams from FIG. 7A, FIG. 8A, FIG. 9A, FIG. 10A, FIG. 11A, and FIG. 12A to FIG. 7D, FIG. 8D, FIG. 9D, FIG. 10D, FIG. 11D, and FIG. 12D are aberration diagrams at a wide angle end. FIG. 7A, FIG. 8A, FIG. 9A, FIG. 10A, FIG. 11A, and FIG. 12A show a spherical aberration (SA), FIG. 7B, FIG. 8B, FIG. 9B, FIG. 10B, FIG. 11B, and FIG. 12B show an astigmatism (AS), FIG. 7C, FIG. 8C, FIG. 9C, FIG. 10C, FIG. 11C, and FIG. 12C show a distortion (DT), and FIG. 7D, FIG. 8D, FIG. 9D, FIG. 10D, FIG. 11D, and FIG. 12D show a chromatic aberration of magnification (CC).

Moreover, diagrams from FIG. 7E, FIG. 8E, FIG. 9E, FIG. 10E, FIG. 11E, and FIG. 12E to FIG. 7H, FIG. 8H, FIG. 9H, FIG. 10H, FIG. 11H, and FIG. 12H are aberration diagrams in an intermediate focal length state. FIG. 7E, FIG. 8E, FIG. 9E, FIG. 10E, FIG. 11E, and FIG. 12E show a spherical aberration (SA), FIG. 7F, FIG. 8F, FIG. 9F, FIG. 10F, FIG. 11F, and FIG. 12F show an astigmatism (AS), FIG. 7G, FIG. 8G, FIG. 9G, FIG. 10G, FIG. 11G, and FIG. 12G show a distortion (DT), and FIG. 7H, FIG. 8H, FIG. 9H, FIG. 10H, FIG. 11H, and FIG. 12H show a chromatic aberration of magnification (CC).

Furthermore, diagrams from FIG. 7I, FIG. 8I, FIG. 9I, FIG. 10I, FIG. 11I, and FIG. 12I to FIG. 7L, FIG. 8L, FIG. 9L, FIG. 10L, FIG. 11L, and FIG. 12L are aberration diagrams at a telephoto end. FIG. 7I, FIG. 8I, FIG. 9I, FIG. 10I, FIG. 11I, and FIG. 12I show a spherical aberration (SA), FIG. 7J, FIG. 8J, FIG. 9J, FIG. 10J, FIG. 11J, and FIG. 12J show an astigmatism (AS), FIG. 7K, FIG. 8K, FIG. 9K, FIG. 10K, FIG. 11K, and FIG. 12K show a distortion (DT), and FIG. 7L, FIG. 8L, FIG. 9L, FIG. 10L, FIG. 11L, and FIG. 12L show a chromatic aberration of magnification.

Next, values of conditional expressions (1) to (15) in each example are given below. '-' (hyphen) indicates that there is no corresponding arrangement.

| | Example 1 | Example 2 | Example 3 |
|---|---|---|---|
| (1) $f_t/f_w$ | 4.81 | 4.81 | 4.8 |
| (2) $|D_{1N}/D_{2P}|$ | 1.7 | 2.231 | 1.718 |
| (3) $|f_{2P}/D_{2P}|$ | 1.801 | 2.022 | 1.773 |
| (4) $|D_{1NS}/D_{2PS}|$ | 1.7 | 2.231 | 1.718 |
| (5) $D_{1PN1PP}/f_{1P}$ | 0.821 | 0.769 | 0.813 |
| (6) $\nu_{1NP}$ | 24.74 | 24.06 | 18.05 |
| (7) $|f_{1Po}| \times f_{1Pt}/IH_t^2$ | 6.497 | 6.708 | 6.214 |
| (8) $\tan\omega_w - (L_{prt}/L_w)$ | 0.834 | 0.832 | 0.85 |
| (9) $DT/(f_{1Po}/IH_t)$ | 6.253 | 6.147 | 6.31 |
| (10) $|(f_{1Po}/IH_t) \times (f_{1P}/IH_t)/\tan\omega_w|$ | 8.532 | 9.143 | 8.096 |
| (11) $|(f_{1Po}/f_w) \times (f_{1P}/f_w)|$ | 8.25 | 8.816 | 8.334 |
| (12) $|(f_{1Po}/IH_t)/(\tan\omega_w)^2|$ | 2.619 | 2.64 | 2.465 |
| (13) $(L_{prt}/IH_t) \times (f_w/IH_t)/\tan\omega_w$ | 2.142 | 2.149 | 2.06 |
| (14) $|f_{1Po}/IH_t|$ | 2.578 | 2.584 | 2.505 |
| (15) $\omega_w$ | 44.775 | 44.693 | 45.233 |

| | Example 4 | Example 5 | Example 6 |
|---|---|---|---|
| (1) $f_t/f_w$ | 4.8 | 4.8 | 4.8 |
| (2) $|D_{1N}/D_{2P}|$ | 2.03 | 2.048 | 1.873 |
| (3) $|f_{2P}/D_{2P}|$ | 2.127 | 2.035 | 1.94 |
| (4) $|D_{1NS}/D_{2PS}|$ | 2.03 | 2.048 | 1.873 |
| (5) $D_{1PN1PP}/f_{1P}$ | 0.85 | 0.839 | 0.817 |
| (6) $\nu_{1NP}$ | 18.05 | — | — |
| (7) $|f_{1Po}| \times f_{1Pt}/IH_t^2$ | 5.871 | 5.966 | 6.53 |
| (8) $\tan\omega_w - (L_{prt}/L_w)$ | 0.844 | 0.85 | 0.85 |
| (9) $DT/(f_{1Po}/IH_t)$ | 6.344 | 6.495 | 6.009 |
| (10) $|(f_{1Po}/IH_t) \times (f_{1P}/IH_t)/\tan\omega_w|$ | 7.505 | 7.647 | 8.4465 |
| (11) $|(f_{1Po}/f_w) \times (f_{1P}/f_w)|$ | 7.679 | 7.858 | 8.675 |
| (12) $|(f_{1Po}/IH_t)/(\tan\omega_w)^2|$ | 2.4 | 2.38 | 2.569 |
| (13) $(L_{prt}/IH_t) \times (f_w/IH_t)/\tan\omega_w$ | 2.073 | 2.064 | 2.064 |
| (14) $|f_{1Po}/IH_t|$ | 2.41 | 2.41 | 2.599 |
| (15) $\omega_w$ | 45.057 | 45.18 | 45.169 |

(Optical Path Bending Digital Camera)

Further, the zoom lens of the present invention described above could be applied to an electrical image pick up apparatus, especially a digital camera, video camera etc, in which the image formed by the above-mentioned zoom lens is photographed by receiving the image on an electrical image pickup element such as CCD etc. Such embodiment will be described below.

Figure 14:
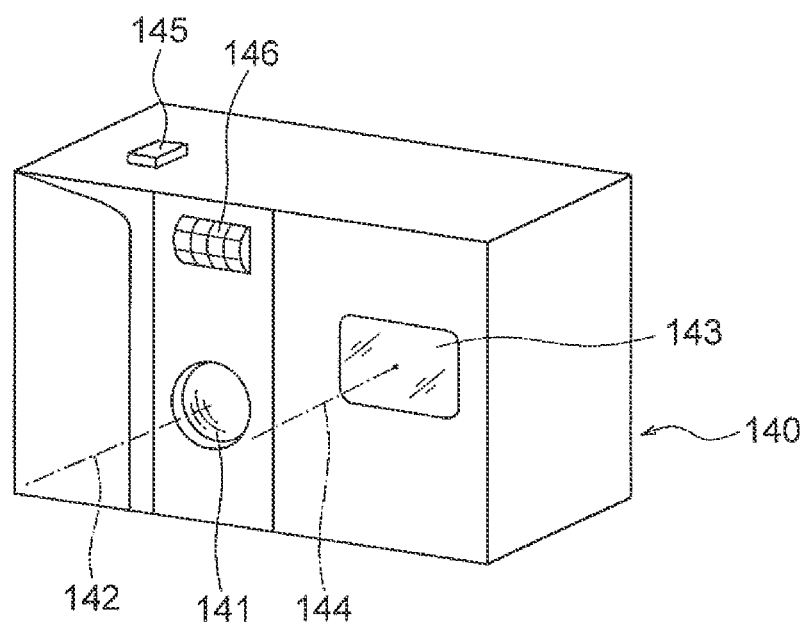
FIG. 14 is a front perspective view showing an appearance of a digital camera in which, the zoom lens in incorporated.
Figure 15:
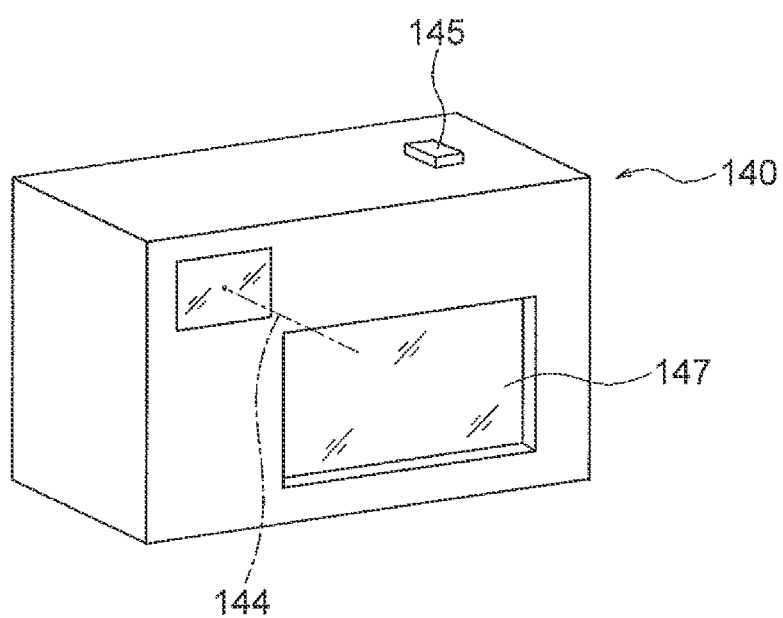
FIG. 15 is a rear perspective view of the digital camera.
Figure 16:
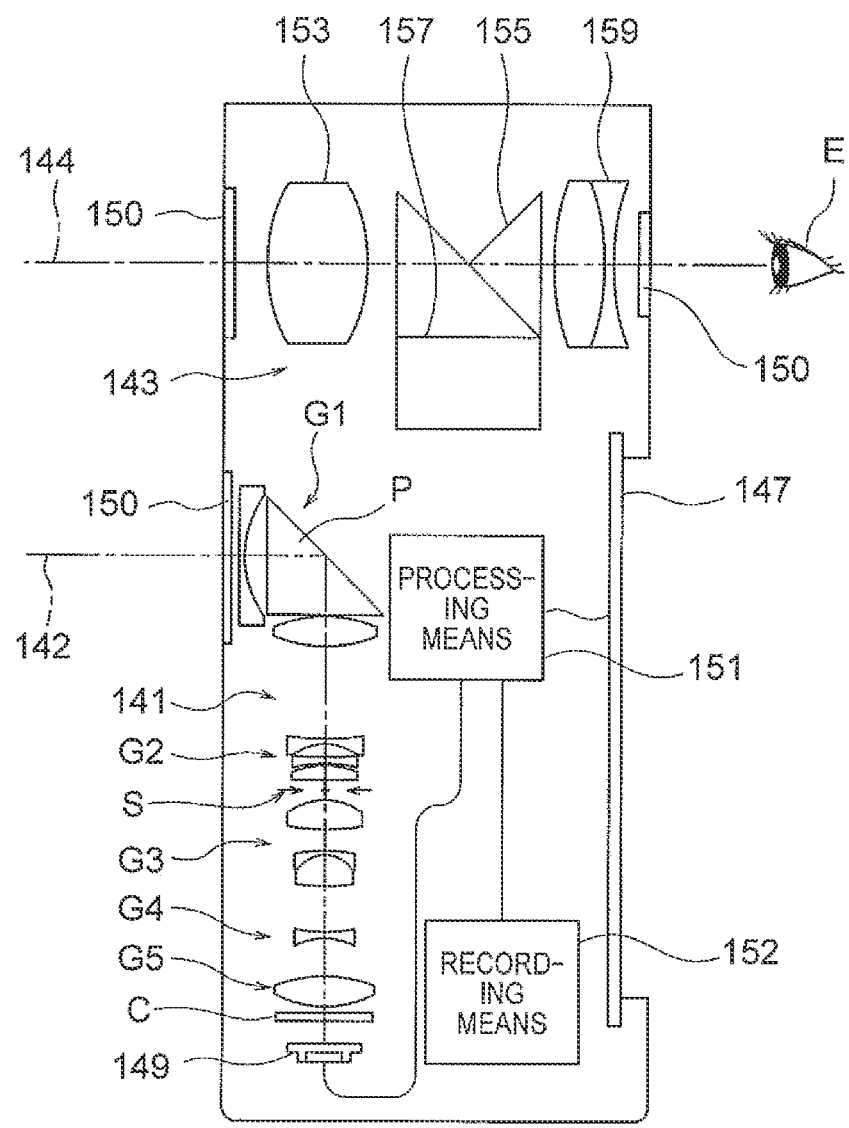
FIG. 16 is a cross-sectional view of the digital camera.

FIG. 14 to FIG. 16 are conceptual diagrams of a structure of a digital camera according to the present invention in which a zoom lens system described above is incorporated in a taking optical system 141. FIG. 14 is a front perspective view showing an appearance of a digital camera 140, FIG. 15 is a rear perspective view of the same, and FIG. 16 is a schematic cross-sectional view showing a structure of the digital camera 140.

The digital camera 140, in a case of this example, includes the taking optical system 141 having a taking optical path 142, a finder optical system 143 having a finder optical path 144, a shutter button 145, a flash 146, a liquid-crystal display monitor 147 etc. When the shutter button 145 disposed on an upper portion of the digital camera 140 is pressed, in synchronization with the pressing of the shutter button 145, a photograph is taken by the taking optical system 141 such as the zoom lens in the first embodiment. An object image formed by the taking optical system 141 is formed on an image pickup surface of a CCD 149 via a cover glass C and a low pass filter on which a wavelength region restricting coating is applied.

An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. An object image formed by the finder objective optical system 153 is formed on a field frame 157 of a Porro prism 155 which is an image erecting member. On a rear side of the Porro prism 155, an eyepiece optical system 159 which guides an erected image to a viewer's eyeball, is disposed. A cover member 150 is disposed on an emergence side of the eyepiece optical system 159.

In the digital camera 140 structured in such manner, since the taking optical system 141 has a high zoom ratio and wide angle of view at the wide angle end, it is possible to realize the inexpensive digital camera in which the optical performance is high and the depth is extremely thin.

Further, the example shown in FIG. 16, a plane parallel plate is disposed as the cover member 150. However, the cover member 150 could be omitted.

(Internal Circuit Structure)

Figure 17:
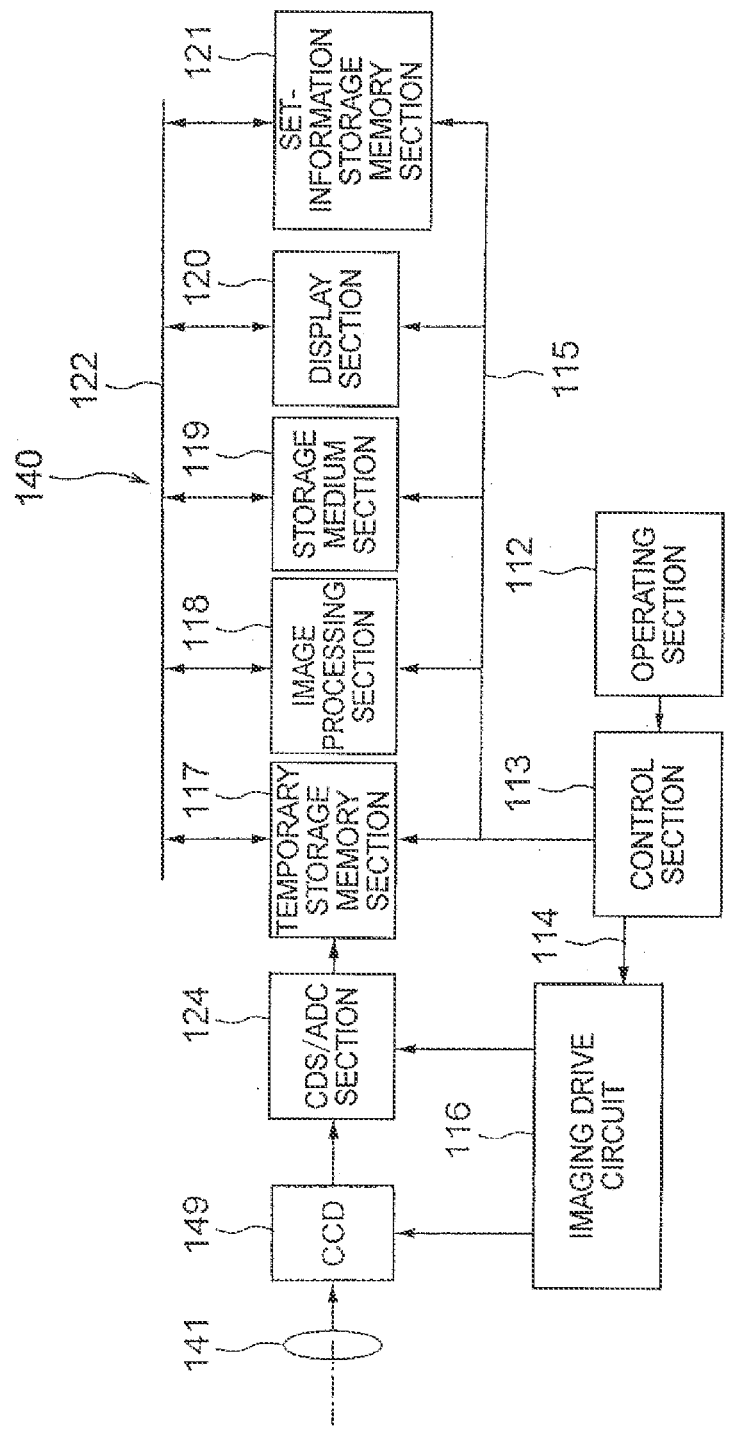
FIG. 17 is a block diagram of a configuration of an internal circuit of main components of the digital camera.

FIG. 17 is a structural block diagram of an internal circuit of main components of the digital camera 140. In the following description, the processing means described above includes for instance, a CDS/ADC section 124, a temporary storage memory 117, and an image processing section 118, and a storage means includes a storage medium section 119.

As shown in FIG. 17, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and informs the control section of an event information which is input from outside (by a user of the digital camera) via these input buttons and switches. The control section 113 is a central processing unit (CPU) for example, and has a built-in computer program memory which is not shown in the diagram. The control section 113 controls the entire digital camera 140 according to a computer program stored in this computer program memory.

The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (Bayer data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 records and maintains the RAW data transferred from the temporary storage memory 117 and image data subjected to image processing in the image processing section 118 in the card flash memory and the stick flash memory.

The display section 120 includes the liquid-crystal display monitor 147, and displays images and operation menu on the liquid-crystal display monitor 147. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

As it has been described so far, the zoom lens and the image pickup apparatus according to the present invention are appropriate for an optical system of an image pickup apparatus which includes a zoom lens in which, both widening of the angle of view and a high zoom ratio are achieved, as well as various aberrations are corrected favorably. Moreover, it is possible to provide a zoom lens in which, the thickness of an optical system is slim while having a high zoom ratio, and the angle of view is wide at the wide angle end, and also various aberrations are corrected favorably, and an image pickup apparatus which includes such zoom lens.

What is claimed is:

1. A zoom lens comprising:
a first positive lens unit having a positive refractive power;
a first negative lens unit having a negative refractive power;
a stop; and
a second positive lens unit having a positive refractive power,
wherein
the first positive lens unit and the first negative lens unit are disposed in order of the first positive lens unit and the first negative lens unit from an object side to an image side, and
the second positive lens unit is disposed on the image side of the first negative lens unit, and
the stop is disposed between the first negative lens unit and the second positive lens unit, and each of the first positive lens unit, the first negative lens unit, and the second positive lens unit includes a lens component, and
at the time of zooming from a wide angle end to a telephoto end, the first positive lens unit is stationary, and the first negative lens unit moves toward the image side and comes closer to the stop, and the second positive lens unit moves toward the object side and comes closer to the stop, and
at the time of focusing, the first positive lens unit is stationary, and the first positive lens unit includes a reflecting member having a reflecting surface which bends an optical path, and a first positive lens unit object-side system, and the first positive lens unit object-side system is positioned on the object side of the reflecting surface, and has a negative refractive power, and the following conditional expressions (1), (2), and (3) are satisfied $$3.7 < f_t/f_w \qquad (1)$$

$$1.55 < |D_{1N}/D_{2P}| < 2.5 \qquad (2)$$

$$1.75 < |f_{2P}/D_{2P}| < 2.5 \qquad (3)$$

where,
$f_t$ denotes a focal length of the overall zoom lens system at the telephoto end,
$f_w$ denotes a focal length of the overall zoom lens system at the wide angle end, and
both $f_t$ and $f_w$ are focal lengths when focused to an object at infinity, and $D_{1N} = D_{1NIt} - D_{1NIw}$, $D_{2P} = D_{2PIt} - D_{2PIw}$, where $D_{1NIt}$ denotes a distance between the first negative lens unit and an image plane, at the telephoto end,
$D_{1NIw}$ denotes a distance between the first negative lens unit and the image plane, at the wide angle end,
$D_{2PIt}$ denotes a distance between the second positive lens unit and the image plane, at the telephoto end, and
$D_{2PIw}$ denotes a distance between the second positive lens unit and the image plane, at the wide angle end, and
each of $D_{1NIt}$, $D_{1NIw}$, $D_{2PIt}$, and $D_{2PIw}$ is a focal length when focused to an object at infinity, and
$f_{2p}$ is a focal length of the second positive lens unit, and
the lens component is a component which has two surfaces namely an object-side surface and an image-side surface, as refracting surfaces in contact with air.

2. The zoom lens according to claim 1, wherein the following conditional expression (4) is satisfied $$1.55 < |D_{1NS}/D_{2PS}| < 2.5 \qquad (4)$$

where, $D_{1NS} = D_{1NSt} - D_{1NSw}$, $D_{2PS} = D_{2PSt} - D_{2PSw}$, where $D_{1NSt}$ denotes a distance between the first negative lens unit and the stop, at the telephoto end,
$D_{1NSw}$ denotes a distance between the first negative lens unit and the stop, at the wide angle end,
$D_{2PSt}$ denotes a distance between the second positive lens unit and the stop, at the telephoto end, and
$D_{2PSw}$ denotes a distance between the second positive lens unit and the stop, at the wide angle end, and each of $D_{1NSt}$, $D_{1NSw}$, $D_{2PSt}$, and $D_{2PSw}$ is a focal length when focused to an object at infinity.

3. The zoom lens according to claim 1, wherein a position of the stop is fixed at the time of zooming from the wide angle end to the telephoto end.

4. The zoom lens according to claim 1, wherein the lens unit positioned nearest to the first negative lens unit, out of the lens units positioned on the image side of the first negative lens unit, is the second positive lens unit.

5. The zoom lens according to claim 1, wherein:
a second negative lens unit having a negative refractive power is disposed on the image side of the second positive lens unit; and
a third positive lens unit having a positive refractive power is disposed on the image side of the second negative lens unit, and
at the time of zooming from the wide angle end to the telephoto end, a distance between the second positive lens unit and the second negative lens unit changes, and a distance between the second negative lens unit and the third positive lens unit changes.

6. The zoom lens according to claim 5, wherein the second negative lens unit moves at the time of focusing.

7. The zoom lens according to claim 5, wherein a position of the second negative lens unit at the telephoto end is more toward the second positive lens unit than a position of the second negative lens unit at the wide angle end, and
the third positive lens unit is stationary at the time of zooming from the wide angle end to the telephoto end.

8. The zoom lens according to claim 5, wherein the zoom lens is a five unit zoom lens which includes in order from the object side to the image side, the first positive lens unit, the first negative lens unit, the stop, the second positive lens unit, the second negative lens unit, and the third positive lens unit.

9. The zoom lens according to claim 5, wherein
the second negative lens unit includes one negative lens component, and
in the negative lens component of the second negative lens unit, a shape of the image-side surface is a concave shape.

10. The zoom lens according to claim 5, wherein
the third positive lens unit includes one positive lens component, and
in the positive lens component of the third positive lens unit, both a shape of the object-side surface and a shape of the image-side surface are convex shapes.

11. The zoom lens according to claim 10, wherein both the object-side surface and the image-side surface of the positive lens component in the third positive lens unit are aspheric surfaces.

12. The zoom lens according to claim 1, wherein
the first positive lens unit includes in order from the object side, a negative lens component, the reflecting member, and a positive lens component, and
the negative lens component is the first positive lens unit object-side system, and
in the negative lens component, a shape of the image-side surface is a concave shape, and
the positive lens component is a first positive lens unit image-side system, and the first positive lens unit image-side system is positioned on the image side of the reflecting surface, and
in the positive lens component, both a shape of the object-side surface and a shape of the image-side surface are convex shapes, and
the reflecting member is made of a prism.

13. The zoom lens according to claim 12, wherein the first positive lens unit satisfies the following conditional expression (5)

$$0.5 < D_{1PN1PP}/f_{1P} < 1.0 \tag{5}$$

where,
$D_{1PN1PP}$ denotes a distance along an optical axis between the negative lens component in the first positive lens unit and the positive lens component in the first positive lens unit, and
$f_{1P}$ denotes a focal length of the first positive lens unit.

14. The zoom lens according to claim 12, wherein both the object-side surface and the image-side surface of the positive lens component in the first positive lens unit are aspheric surfaces.

15. The zoom lens according to claim 1, wherein
the first negative lens unit includes a negative lens component which is disposed nearest to the object side, and a positive lens component which is disposed nearest to the image side, and
in the negative lens component disposed nearest to the object side in the first negative lens unit, both a shape of the object-side surface and a shape of the image-side surface are concave surfaces.

16. The zoom lens according to claim 15, wherein
both the object-side surface and the image-side surface of the negative lens component disposed nearest to the object side in the first negative lens unit are aspheric surfaces, and
the image-side surface of the positive lens component disposed nearest to the image side in the first negative lens unit is an aspheric surface.

17. The zoom lens according to claim 15, wherein
the positive lens component disposed nearest to the image side in the first negative lens unit is a single lens, and
the single lens satisfies the following conditional expression (6)

$$v_{1NP} < 29 \tag{6}$$

where,
$v_{1NP}$ denotes Abbe's number for a d-line of the single lens.

18. The zoom lens according to claim 15, wherein
the positive lens component disposed nearest to the image side in the first negative lens unit is a cemented lens, and
the cemented lens includes in order from the object side, a biconvex positive lens and a negative meniscus lens.

19. The zoom lens according to claim 1, wherein
the second positive lens unit includes in order from the object side, a positive lens component and a cemented lens, and
in the positive lens component of the second positive lens unit, both a shape of the object-side surface and a shape of the image-side surface are convex shapes, and
the cemented lens in the second positive lens unit includes in order from the object side, a negative lens having a concave surface directed toward the image side, and a biconvex positive lens.

20. The zoom lens according to claim 19, wherein both the object-side surface and the image-side surface of the positive lens component in the second positive lens unit are aspheric surfaces.

21. The zoom lens according to claim 1, wherein
the first positive lens unit includes a first positive lens unit image-side system which is positioned on the image side of the reflecting surface, and
the following conditional expression (7) is satisfied $$4.5 \leq |f_{1Po}| \times f_{1Pi}/IH_t^2 \leq 7.5 \qquad (7)$$

where,
$f_{1Po}$ denotes a focal length of the first positive lens unit object-side system,
$f_{1Pi}$ denotes a focal length of the first positive lens unit image-side system, and
$IH_t$ denotes the maximum image height when focused to an object at infinity, at the telephoto end.

22. The zoom lens according to claim 1, wherein
the reflecting member is a prism, and
the following conditional expressions (8) and (9) are satisfied $$0.7 \leq \tan \omega_w - (L_{pri}/L_w) \leq 1.3 \qquad (8)$$

$$3.5 \leq DT/(f_{1Po}/IH_t) \leq 16 \qquad (9)$$

where,
$\omega_w$ denotes the maximum half angle of view when focused to an object at infinity, at the wide angle end,
$L_{pri}$ denotes a total length of the prism along an optical axis, and the total length of the prism is a distance from an optical surface of the prism on the object side of the reflecting surface, up to an optical surface of the prism on the image side of the reflecting surface,
$L_w$ denotes a distance which added an air-converted back-focus length to a total length of the overall zoom lens system along the optical axis, and is a distance when focused to an object at infinity, at the wide angle end, and the total length of the overall zoom lens system is a distance from a lens surface nearest to the object side of the zoom lens, up to a lens surface nearest to the image-side surface of the zoom lens, and $DT=(IH_w-f_w \times \tan \omega_w)/(f_w \times \tan \omega_w) \times 100$, and the unit is percentage, and $f_{1Po}$ denotes a focal length of the first positive lens object-side system,
$IH_t$ denotes the maximum image height when focused to an object at infinity, at the telephoto end,
$IH_w$ denotes the maximum image height when focused to an object at infinity, at the wide angle end, and
$f_w$ denotes a focal length of the overall zoom lens system when focused to an object at infinity, at the wide angle end.

23. The zoom lens according to claim 1, wherein the following conditional expressions (10) and (11) are satisfied $$4.2 \leq |(f_{1Po}/IH_t) \times (f_{1P}/IH_t)/\tan \omega_w| \leq 11.6 \qquad (10)$$

$$5.6 \leq |(f_{1Po}/f_w) \times (f_{1P}/f_w)| \leq 11.5 \qquad (11)$$

where,
$f_{1Po}$ denotes a focal length of the first positive lens unit object-side system,
$f_{1P}$ denotes a focal length of the first positive lens unit,
$IH_t$ denotes the maximum image height when focused to an object at infinity, at the telephoto end,
$\omega_w$ denotes the maximum half angle of view when focused to an object at infinity, at the wide angle end, and
$f_w$ denotes a focal length of the overall zoom lens system when focused to an object at infinity, at the wide angle end.

24. The zoom lens according to claim 1, wherein the following conditional expression (12) is satisfied $$1.0 \leq |(f_{1Po}/IH_t)/(\tan \omega_w)^2| \leq 3.7 \qquad (12)$$

where,
$f_{1Po}$ denotes a focal length of the first positive lens unit object-side system,
$IH_t$ denotes the maximum image height when focused to an object at infinity at the telephoto end, and
$\omega_w$ denotes the maximum angle of view when focused to an object at infinity at the wide angle end.

25. The zoom lens according to claim 1, wherein
the reflecting member is a prism, and
the following conditional expression (13) is satisfied $$1.5 \leq (L_{pri}/IH_t) \times (f_w/IH_t)/\tan \omega_w \leq 2.8 \qquad (13)$$

where,
$L_{pri}$ denotes a total length of the prism along an optical axis, and the total length of the prism is a distance from an optical surface of the prism on the object side of the reflecting surface, up to an optical surface of the prism on the image side of the reflecting surface,
$IH_t$ denotes the maximum image height when focused to an object at infinity, at the telephoto end,
$f_w$ denotes a focal length of the overall zoom lens system when focused to an object at infinity, at the wide angle end, and
$\omega_w$ denotes the maximum half angle of view when focused to an object at infinity at the wide angle end.

26. The zoom lens according to claim 1, wherein the following conditional expression (14) is satisfied $$1.2 \leq |f_{1Po}/IH_t| \leq 3.6 \qquad (14)$$

where,
$f_{1Po}$ denotes a focal length of the first positive lens unit object-side system, and
$IH_t$ denotes the maximum image height when focused to an object at infinity, at the telephoto end.

27. The zoom lens according to claim 1, wherein the following conditional expression (15) is satisfied $$\omega_w \geq 42° \qquad (15)$$

where
$\omega_w$ denotes the maximum half angle of view when focused to an object at infinity at the wide angle end.

28. An image pickup apparatus comprising:
a zoom lens according to claim 1; and
an image pickup element which converts an image formed by the zoom lens to an electric signal.

* * * * *